United States Patent
Yamauchi

(10) Patent No.: US 11,187,291 B2
(45) Date of Patent: Nov. 30, 2021

(54) ELECTRIC BRAKE DEVICE AND VEHICULAR BRAKE SYSTEM INCLUDING ELECTRIC BRAKE DEVICE

(71) Applicant: TOYOTA JIDOSHA KABUSHIKI KAISHA, Toyota (JP)

(72) Inventor: Yoji Yamauchi, Tajimi (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 270 days.

(21) Appl. No.: 16/180,693

(22) Filed: Nov. 5, 2018

(65) Prior Publication Data

US 2019/0145475 A1 May 16, 2019

(30) Foreign Application Priority Data

Nov. 13, 2017 (JP) .............................. JP2017-218258

(51) Int. Cl.
*F16D 65/18* (2006.01)
*F16D 55/226* (2006.01)
(Continued)

(52) U.S. Cl.
CPC ............ *F16D 65/18* (2013.01); *B60T 13/741* (2013.01); *F16D 55/226* (2013.01);
(Continued)

(58) Field of Classification Search
CPC ...... B60T 13/662; B60T 7/042; B60T 17/221; B60T 17/22; B60T 7/085; B60T 8/00;
(Continued)

(56) References Cited

U.S. PATENT DOCUMENTS 6,397,981 B1   6/2002 Tamasho et al.
8,239,100 B2 * 8/2012 Ueno .................... B60T 13/746
                                                      701/45
(Continued)

FOREIGN PATENT DOCUMENTS

EP         1085240 A1    3/2001
JP       2000055093 A    2/2000
(Continued)

OTHER PUBLICATIONS

English translation of JP 2017056746A (Year: 2017).*
Communication dated Mar. 19, 2019 from the European Patent Office in application No. 18205452.8.

*Primary Examiner* — Robert A. Siconolfi
*Assistant Examiner* — Mahbubur Rashid
(74) *Attorney, Agent, or Firm* — Sughrue Mion, PLLC

(57) ABSTRACT

An electric brake device to be mounted on a vehicle includes a rotating body, a friction member, an electric motor, a piston, an operation conversion mechanism, an actuator, and a controller. The operation conversion mechanism is configured to include a rotating member and a linear motion member. The controller is configured to selectively execute a standby control of causing the linear motion member to stand by at a standby position where a clearance between the friction member and the rotating body is not larger than a backlash between a male screw and a female screw, and a backward movement control of moving the linear motion member backward to a backward movement position where the clearance is allowed to be equal to or more than the backlash, in a case where there is no braking force request for the electric brake device.

18 Claims, 11 Drawing Sheets

(51) Int. Cl.
  *B60T 13/74* (2006.01)
  *F16D 121/24* (2012.01)
  *F16D 125/40* (2012.01)
  *F16D 125/50* (2012.01)

(52) U.S. Cl.
  CPC ...... *F16D 2121/24* (2013.01); *F16D 2125/40* (2013.01); *F16D 2125/50* (2013.01)

(58) Field of Classification Search
  CPC .......... B60T 8/17; B60T 13/741; B60T 13/66; B60T 17/18; B60T 8/26; B60T 13/665; B60T 13/74; B60T 2270/608; B60T 7/107; F16D 57/002; F16D 65/18; F16D 55/226; F16D 2121/24; F16D 2125/40; F16D 2125/50
  See application file for complete search history.

(56) References Cited

U.S. PATENT DOCUMENTS

| | | | | |
|---|---|---|---|---|
| 8,997,947 | B2* | 4/2015 | Shiraki | F16D 55/226 188/72.7 |
| 2004/0104618 | A1* | 6/2004 | Yamamoto | B60T 13/741 303/20 |
| 2014/0069750 | A1 | 3/2014 | Nohira et al. | |
| 2015/0151727 | A1* | 6/2015 | Yasui | B60T 17/22 701/70 |
| 2015/0362033 | A1* | 12/2015 | Yasui | F16D 55/226 188/72.8 |
| 2017/0232849 | A1* | 8/2017 | Yamamoto | B60T 8/172 303/15 |

FOREIGN PATENT DOCUMENTS

| | | | |
|---|---|---|---|
| JP | 2001-80495 | A | 3/2001 |
| JP | 2001-341626 | A | 12/2001 |
| JP | 2007-38884 | A | 2/2007 |
| JP | 2010-236656 | A | 10/2010 |
| JP | 2012-240632 | A | 12/2012 |
| JP | 2014141214 | A | 8/2014 |
| JP | 2015-048850 | A | 3/2015 |
| JP | 2017056746 | A * | 3/2017 |
| WO | 2014115872 | A1 | 7/2014 |

* cited by examiner

ELECTRIC BRAKE DEVICE AND VEHICULAR BRAKE SYSTEM INCLUDING ELECTRIC BRAKE DEVICE

INCORPORATION BY REFERENCE

The disclosure of Japanese Patent Application No. 2017-218258 filed on Nov. 13, 2017 including the specification, drawings and abstract is incorporated herein by reference in its entirety.

BACKGROUND

1. Technical Field

The present disclosure relates to an electric brake device that applies a braking force on a wheel depending on a force generated by an electric motor, and a vehicular brake system configured to include the electric brake device.

2. Description of Related Art

General electric brake devices are configured to include i) a rotating body that rotates together with a wheel, ii) a friction member that is pressed against the rotating body to generate a braking force due to friction with the rotating body, and iii) an actuator having an electric motor serving as a drive source, and a piston and to operate the electric motor to move the piston forward to press the friction member against the rotating body through the forward movement of the piston. In the electric brake devices as described above, it is desired that the time taken from occurrence of a braking force request to actual generation of a braking force is short, that is, responsiveness is excellent. For that reason, for example, as described in the following Japanese Unexamined Patent Application Publication No. 2012-240632 (JP 2012-240632 A), when there is no braking force request, the piston is located such that a clearance between the friction member and the rotating body is within an appropriate range.

Meanwhile, general actuators have an operation conversion mechanism for mutually converting the rotation of the electric motor and the forward and backward movement of the piston. A screw mechanism constituted of a rotating member having one of a male screw and a female screw and a linear motion member having the other screw is adopted as the operation conversion mechanism. In order to smoothly operate the screw mechanism, for example, a lubricant, such as grease, may be interposed between the male screw and the female screw, as described in following Japanese Unexamined Patent Application Publication No. 2015-48850 (JP 2015-48850 A).

SUMMARY

However, when the clearance is made as small as possible in consideration of the above-described responsiveness, specifically, when the clearance is made smaller than the backlash of the screw mechanism, a phenomenon in which a lubricant does not enter well between one surface of a screw ridge and the other surface side of a screw groove that faces the one surface is caused. As a result, the smooth operation of the screw mechanism, that is, the smooth operation of the actuator, is hindered. Paying attention to the problem as described above, room for performing improvements for enhancing practicality has been left behind in the related-art electric brake devices. The present disclosure provides an electric brake device having high practicality and a vehicular brake system having high practicality and configured to include the electric brake device.

The electric brake device is configured such that, when there is no braking force request for the electric brake device, a controller of the electric brake device that controls the rotation of the electric motor selectively executes (a) a standby control of causing the linear motion member to stand by at a standby position where a clearance between the friction member and the rotating body is not larger than a backlash between the male screw and the female screw, and (b) a backward movement control of moving the linear motion member backward to a backward movement position that allows the clearance to be equal to or more than the backlash. The brake system includes a plurality of brake devices, and at least one of the brake devices is the electric brake device described above.

With the electric brake device, by selectively executing the standby control and the backward movement control, the lubricant can be caused to spread both between the one surface of the screw ridge of the male screw and the one surface of the screw groove of the female screw that faces the one surface of the screw ridge and between the other surface of the screw ridge of the male screw and the other surface of the screw groove of the female screw that faces the other surface of the screw ridge, and the effect that the smooth operation of the actuator is guaranteed is exhibited. With the brake system, the effects of the electric brake device of the present disclosure can be obtained by adopting the electric brake device.

In the following, some aspects of the disclosure are exemplified, and the aspects will be described. Similar to the claims, the respective aspects are divided into sections, numbers are attached to the respective sections, and description will be made in the form of citing the numbers of other sections as needed. This is merely to facilitate the understanding of the present disclosure, and is not intended to limit combinations of constituent elements to those described in the following respective sections. That is, the present disclosure should be interpreted in consideration of the description accompanying the respective sections, the description of the embodiments, and the like. As long as the disclosure conforms to the interpretation, aspects in which other further constituent elements are added to the aspects of the respective sections and aspects in which some constituent elements are eliminated from the aspects of the respective sections may be aspects of the disclosure.

(1) A first aspect of the disclosure relates to an electric brake device to be mounted on a vehicle. The electric brake device includes a rotating body configured to rotate together with a wheel; a friction member configured to generate a braking force due to friction with the rotating body by being pressed against the rotating body; an electric motor serving as a drive source; a piston; an operation conversion mechanism configured to convert a rotation of the electric motor into a forward and backward movement of the piston; an actuator configured to press the friction member against the rotating body by forward movement of the piston; and a controller configured to control the actuator by controlling a rotation of the electric motor. The operation conversion mechanism is configured to include a rotating member that is formed with one of a male screw and a female screw threadedly engaged with each other in a state where a lubricant is interposed and is rotatable by the rotation of the electric motor, and a linear motion member formed with the other of the male screw and the female screw and adapted to be movable forward and backward to move the piston forward and backward. The controller selectively executes (a) a standby control of causing the linear motion member to stand by at a standby position where a clearance between the friction member and the rotating body is not larger than a backlash between the male screw and the female screw, and (b) a backward movement control of moving the linear motion member backward to a backward movement position where the clearance is allowed to be equal to or more than the backlash, in a case where there is no braking force request for the electric brake device.

The first aspect of the disclosure is a basic aspect of the electric brake device. According to the first aspect of the disclosure, when there is no braking force request, the standby control makes it possible to locate the piston at the position for realizing the clearance such that the responsiveness of the electric brake device becomes excellent while avoiding a dragging phenomenon, that is, a phenomenon in which the wheel rotates while the friction member is pushed against the rotating body. Meanwhile, the backward movement control makes it possible to cause the lubricant to spread between the male screw and female screw threadedly engaged with each other, in detail, both between one surface of a screw ridge of the male screw and one surface of a screw groove of the female screw that faces the one surface of the screw ridge, and between the other surface of the screw ridge of the male screw and the other surface of the screw groove of the female screw that faces the other surface of the screw ridge. According to the first aspect of the disclosure, it is possible to guarantee both the responsiveness of the electric brake device and the smoothness of the operation by making a condition, a timing, and the like for performing the backward movement control appropriate.

Although the shapes of the "male screw" and the "female screw" threadedly engaged with each other are not particularly limited, it is desirable to adopt trapezoidal screws as the male screw and the female screw from advantages that the pitch is relatively large and the strength is high. Generally, since the trapezoidal screws have a relatively large backlash, the significance of executing the backward movement control, that is, the significance of applying the present aspect, is large. The male screw may be formed in the rotating member and the female screw may be formed in the linear motion member. Conversely, the female screw may be formed in the rotating member and the male screw may be formed in the linear motion member.

The "linear motion member" is not necessarily provided separately from "the piston". The linear motion member and the piston may be integrated with each other. Regarding the "clearance", for example when a pair of the friction members is pressed against both surfaces of the rotating body, the sum of a gap between each of these friction members and the rotating body becomes the clearance. Additionally, in a case where the piston and the friction member are not integrated with each other, or in a case where the caliper body and the friction member are not integrated with each other, for example, in a case where the electric brake device is held so as to be movable with respect to the rotating body as a brake caliper, a sum obtained by a gap formed between the piston and the friction member or a gap formed between the caliper body and a friction member is the clearance. In a case where the piston and the linear motion member are not integrated with each other, the sum adding the gap formed between the piston and the linear motion member is the clearance.

Both the "standby position" and the "backward movement position" do not need to be fixed positions. A plurality of standby positions and a plurality of backward movement positions that are different depending on various conditions may be set. The "braking force request" may be based on the operation of a brake operating member, such as a brake pedal, by a driver, or may be based on a command from an autonomous driving system or the like.

(2) In the electric brake device according to the first aspect of the disclosure, the controller may be configured to start the execution of the standby control to allow the backward movement of the linear motion member when the braking force request for the electric brake device has cancelled when a pre-set precondition is not satisfied, and to start the execution of the backward movement control when the braking force request has cancelled when the pre-set precondition is satisfied.

The "pre-set precondition" in the first aspect of the disclosure can be considered to be an allowable condition for the execution of the backward movement control. Conversely, the pre-set precondition being not satisfied can also be considered as a prohibited condition in the execution of the backward movement control. For example, in a case where the electric brake device is configured to selectively execute the standby control and the backward movement control with an event that the braking force request has cancelled as a start condition, normally, the standby control is executed, and when the pre-set precondition is satisfied, the backward movement control may be executed. In that case, when the pre-set precondition is a condition that the backward movement control is executed to such a degree that a smooth operation is guaranteed, the backward movement control can be executed at a low frequency.

(3) In the electric brake device according to the first aspect of the disclosure, the pre-set precondition may be set based on an activating state of the electric brake device.

(4) In the electric brake device according to the first aspect of the disclosure, the activating state of the electric brake device may be indexed depending on the number of times the electric brake device has generated the braking force after the backward movement control is executed at the latest, and the controller may be configured to use an event that the number of times has exceeded a pre-set number as the pre-set precondition and to start the execution of the backward movement control when the pre-set condition is satisfied.

The above-described (3) and (4) are aspects in which limitations are added to the pre-set precondition. In the above (3), for example, the backward movement control may be executed on the condition that the "activating state" becomes a state where lubrication using the lubricant between the male screw and the female screw is presumed to be insufficient. As indexes showing the "operating state", specifically, for example, it is possible to adopt "a temporal integral value of the braking force generated by the electric brake device after the backward movement control is executed at the latest", and the like, including "the number of times the electric brake device has generated the braking force after the backward movement control is executed at the latest" in the above (4).

(5) In the electric brake device according to the first aspect of the disclosure, the controller may be configured to allow the execution of the backward movement control in a low brake operation possibility situation where the possibility of a brake operation by a driver is low.

The first aspect of the disclosure is an aspect in which the condition that the electric brake device is placed in the "low brake operation possibility situation" is an allowable condition in the execution of the backward movement control, and conversely, can be considered as an aspect in which the condition that the electric brake device is not placed in the "low brake operation possibility situation" is a prohibited condition in the execution of backward movement control. When there is no braking force request, the backward movement control may be executed on a start condition that the electric brake device is placed in the "low brake operation possibility situation". In a case where the automatic braking is also taken into consideration, instead of the low brake operation possibility situation, the execution of backward movement control may be allowed in the low braking force request possibility situation where a possibility that the braking force request is made is low.

(6) In the electric brake device according to the first aspect of the disclosure, the controller may be configured to allow the execution of the backward movement control based on an instruction showing that the vehicle is in the low brake operation possibility situation from a monitoring system in a case where the vehicle is equipped with the monitoring system that monitors a situation around the vehicle.

The first aspect of the disclosure is an aspect in which limitations are added to "being in the low brake operation possibility situation". As examples of the "monitoring system", there are a vehicle autonomous driving system, a vehicle collision avoidance system, and the like. Specifically, for example, in the above-described systems, the probability that a braking force request for the host vehicle is made may be determined to be low, that is, the probability that a brake operation by a driver is made may be determined to be low on the condition that other vehicles, obstacles, and the like that are approaching the front of the host vehicle, are not present, and the execution of the backward movement control may be allowed or the backward movement control may be executed based on the determination.

(7) In the electric brake device according to the first aspect of the disclosure, the low brake operation possibility situation may be determined based on at least one of the operating state of the vehicle and a traveling state of the vehicle.

(8) In the electric brake device according to the first aspect of the disclosure, the traveling state of the vehicle may be indexed depending on the presence or absence of an accelerator operation of the vehicle, and the operating state of the vehicle may be indexed depending on a traveling speed of the vehicle, and the controller is configured to allow the execution of the backward movement control when the traveling speed of the vehicle is equal to or less than a set speed and the accelerator operation is not performed.

The above-described (7) and (8) are aspects in which separate limitations are added to "being in the low brake operation possibility situation". As indexes showing "the operating state of the vehicle", for example, "the presence or absence or degree of a steering operation of the vehicle", and the like may be adopted, including "the presence or absence of the accelerator operation" in the above (8). Incidentally, the accelerator operation, the steering operation, and the like are not limited to those performed by a driver himself/herself, and may be an autonomous operation by an autonomous driving system. As indexes showing "the traveling state of the vehicle", for example, "a lateral acceleration and a forward and backward acceleration generated in the vehicle", "pitch behavior, roll behavior, and yaw behavior of the vehicle", and the like may be adopted, including "the traveling speed of the vehicle" in the above (8). It can be said that the allowable condition in the above (8) is a condition set from a viewpoint of "a decrease in the responsiveness due to the backward movement control does not have a bad influence even when the braking force request has been generated".

(9) In the electric brake device according to the first aspect of the disclosure, the backward movement control may include a control for moving the linear motion member forward up to the standby position after the linear motion member is moved backward up to the backward movement position.

Simply, the first aspect of the disclosure can be considered to be an aspect in which the standby control is executed so as to move the linear motion member forward after the linear motion member arrives at the backward movement position in the backward movement control. The responsiveness of the electric brake device deteriorates in a state where the linear motion member is located at the backward movement position.

According to the first aspect of the disclosure, it is possible to quickly solve the state where the responsiveness of the electric brake device deteriorates by moving the linear motion member, which has been moved backward up to the backward movement position, forward up to the standby position. Even when the standby position where the linear motion member is moved forward in the backward movement control and the standby position where the linear motion member is located in the standby control may be the same positions as each other or may be positions different from each other.

(10) In the electric brake device according to the first aspect of the disclosure, the controller may be configured to transmit a signal showing the execution of the backward movement control.

As described earlier, since the backward movement control is the control for moving the linear motion member backward up to the backward movement position, there is a concern that the responsiveness of the electric brake device deteriorates when the backward movement control is executed. According to the first aspect of the disclosure, the fact that the backward movement control is being executed can be notified to, for example, other systems, other brake devices, and the like. Therefore, in the above-described other systems, other brake devices, and the like, it is possible to cope with the deterioration of the responsiveness in the electric brake device.

(11) A second aspect of the disclosure relates to a vehicular brake system including the electric brake device; and a separate brake device provided at a wheel separate from the wheel provided with the electric brake device.

The second aspect of the disclosure is an aspect regarding the brake system in which one of a plurality of wheels provided in the vehicle is provided with the electric brake device of the aspect and one or more other wheels in the wheels are provided with other brake devices. As the "other brake devices", in the brake system, solely one brake device may be provided or a plurality of brake devices may be provided. The other brake devices may generate a braking force solely for one wheel or may generate braking forces for a plurality of wheels. Moreover, the other brake devices may be the same brake devices as the electric brake device of the aspect in terms of configuration or may be brake devices of different types or different configurations. With the brake system of the second aspect of the disclosure, it is possible to enjoy the merits enjoyed by the electric brake device of the aspect even in the brake system.

(12) In the brake system according to the second aspect of the disclosure, the separate brake device may be a hydraulic brake device configured to include a wheel brake that generates a braking force by pressing the friction member against the rotating body that rotates together with the wheel, based on a pressure of a hydraulic fluid to be supplied to the separate brake device, a high pressure source device for supplying a high-pressure hydraulic fluid to the wheel brake when the high pressure source device is operated, and a pressure adjusting device that adjusts the pressure of the hydraulic fluid to be supplied from the high pressure source device to the wheel brake to a pressure according to a braking force request for the separate brake device.

The brake system of the second aspect of the disclosure is simply a brake system in which the electric brake device and the hydraulic brake device are mixed with each other. The electric brake device has a merit that the responsiveness is excellent and the hydraulic brake device has a merit that the reliability is high. With the brake system of the second aspect of the disclosure, it is possible to construct a highly efficient brake system taking advantage of these merits.

(13) In the brake system according to the second aspect of the disclosure, the brake system may be configured to execute a responsiveness improvement control for further improving responsiveness of the separate brake device with respect to the braking force request for the separate brake device when the backward movement control is executed in the electric brake device.

The second aspect of the disclosure can be considered to be an aspect to cope with the deterioration of the responsiveness of the electric brake device during the execution of the backward movement control by executing the responsiveness improvement control in the other brake devices. With the second aspect of the disclosure, it is possible to avoid a situation where the responsiveness of the entire brake system deteriorates, in advance.

(14) In the brake system according to the second aspect of the disclosure, the separate brake device may be configured to include a wheel brake that generates a braking force by pressing the friction member against the rotating body that rotates together with the wheel, based on a pressure of a hydraulic fluid to be supplied to the separate brake device, a high pressure source device configured to supply a high-pressure hydraulic fluid to the wheel brake when the high pressure source is operated, and a pressure adjusting device configured to adjust the pressure of the hydraulic fluid to be supplied from the high pressure source device to the wheel brake in accordance with the braking force request for the separate brake device, and the responsiveness improvement control may be a control for performing at least one of advancing a timing of start of the operation of the high pressure source device and raising the pressure of the hydraulic fluid adjusted by the pressure adjusting device.

In a case where the separate brake device is the hydraulic brake device, particularly, a hydraulic brake device in which an accumulator that stores the hydraulic fluid from the high pressure source device is not present, the timing of generation of a hydraulic braking force that is a braking force generated by the hydraulic brake device is delayed unless the high pressure source device is operated in advance. Meanwhile, when the pressure of the hydraulic fluid to be supplied to the wheel brake is made high, the rising gradient of the hydraulic braking force is large. As a result, it is possible to relax a delay in tracking an increase in reply to the braking force request. In the second aspect of the disclosure, when the backward movement control is executed in the electric brake device using those phenomena, the responsiveness improvement control in the second aspect of the disclosure is executed in the hydraulic brake device in order to prevent or relax the deterioration of the responsiveness of the entire brake system.

(15) In the brake system according to the second aspect of the disclosure, the controller may be configured to transmit a signal showing the execution of the backward movement control, and the responsiveness improvement control is configured to be executed based on the signal.

According to the second aspect of the disclosure, since the responsiveness improvement control is executed based on the instruction from the electric brake device, it is possible to effectively avoid the deterioration of the responsiveness of the entire brake system.

(16) In the brake system according to the second aspect of the disclosure, when a sum of the braking force generated by the electric brake device and the braking force generated by the separate brake device decreases to be equal to or less than a set level, the brake system may be configured to cancel a braking force request for the electric brake device and to increase the braking force generated by the separate brake device by an amount of the braking force to be generated by the electric brake device.

According to the second aspect of the disclosure, since the state where there is no braking force request for the electric brake device is positively realized, it is possible to raise the frequency of execution of the backward movement control in the electric brake device.

(17) In the brake system according to the second aspect of the disclosure, the separate brake device may be an electric brake device having the same configuration as that of the electric brake device, and the brake system may be configured to, when one of the electric brake devices is executing the backward movement control, prohibit the other electric brake device from executing the backward movement control.

According to the aspects of the disclosure, since the backward movement control is prohibited from being simultaneously performed in a plurality of electric brake devices in a case where the electric brake devices are provided, it is possible to make the risk that the responsiveness deteriorates in the brake system low.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, embodiments of an electric brake device and a brake system will be described in detail with reference to the drawings. The embodiments can be carried out in various modes in which various changes and improvements are made based on the knowledge of a person's skilled in the art, including the modes described in the above section "Aspects of the disclosure" in addition to the following embodiments.

[A] Outline of Vehicle Drive System and Brake System

Figure 1:
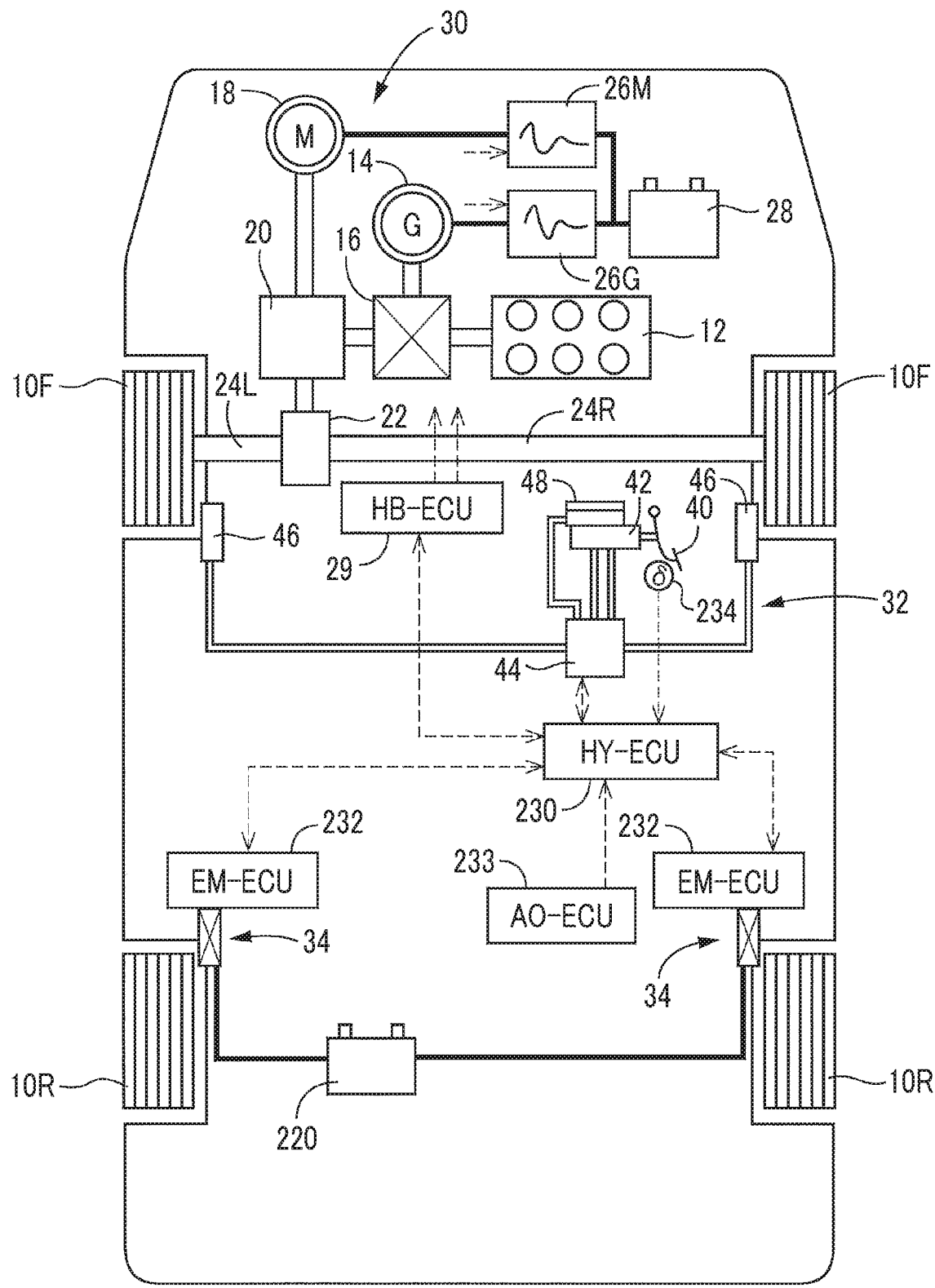
FIG. 1 is a view conceptually illustrating an overall configuration of a brake system of an embodiment.

As illustrated in a schematic view of FIG. 1, a vehicle on which the brake system of the embodiment is mounted is a hybrid vehicle in which front wheels 10F and rear wheels 10R are two, respectively, and the two front wheels 10F are drive wheels. First, to describe the vehicle drive system, the vehicle drive system mounted on the present vehicle has an engine 12 serving as a drive source, a generator 14 that mainly functions as a power generator, a power split device 16 to which the engine 12 and the generator 14 are coupled, and an electric motor 18 that is another drive source.

The power split device 16 has a function of splitting the rotation of the engine 12 into the rotation of the generator 14 and the rotation of an output shaft. The electric motor 18 is connected to the output shaft via a reduction mechanism 20 that functions as a speed reducer. The rotation of the output shaft is transmitted via a differential mechanism 22 and drive shafts 24L, 24R, and the right and left front wheel 10F are rotationally driven. The generator 14 is connected to a battery 28 via an inverter 26G, and the electrical energy obtained by the power generation of the generator 14 is stored in the battery 28. The electric motor 18 is also connected to the battery 28 via an inverter 26M, and the operation of the electric motor 18 and the operation of the generator 14 are controlled by controlling the inverter 26M and the inverter 26G, respectively. The management of the charging rate of the battery 28 and the control of the inverter 26M and the inverter 26G are performed by a hybrid electronic control unit (hereinafter simply also referred to as "HB-ECU") 29 configured to include a computer, a drive circuit (driver) of respective devices that constitute the vehicle drive system, and the like.

As schematically illustrated in FIG. 1, the brake system of the embodiment mounted on the present vehicle is configured to roughly include (a) a regenerative brake device 30 that applies a braking force to each of the two front wheels 10F, (b) a hydraulic brake device 32 that applies a braking force to each of the two front wheels 10F independently from the braking force applied by the regenerative brake device 30, and (c) a pair of electric brake devices 34 that applies braking forces to the two rear wheels 10R, respectively. The electric brake devices 34 are electric brake devices of the embodiment.

[B] Configuration of Regenerative Brake Device

The regenerative brake device 30 can be considered to constitute a portion of the vehicle drive system in terms of hardware. At the time of vehicle deceleration, due to the rotation of the front wheels 10F, the electric motor 18 rotates without being supplied with the electrical power from the battery 28. The electric motor 18 generates power, using an electromotive force caused by the rotation, and the generated electrical power is accumulated as electric quantity in the battery 28 via the inverter 26M. That is, the electric motor 18 is made to function as a generator and changes the battery 28. The rotation of the front wheels 10F, that is, the vehicle is decelerated as much by the energy equivalent to the charged electric quantity. The present vehicle is constituted of the regenerative brake device 30 as described above. The braking force (hereinafter simply also referred to as a "regenerative braking force") applied to each of the front wheels 10F by the regenerative brake device 30 is based on a power generation amount, and the generated regenerative braking force is controlled by the control of the inverter 26M performed by the HB-ECU 29. Since one having a general configuration can be adopted for the regenerative brake device 30, a detailed description regarding the regenerative brake device 30 will be omitted.

[C] Configuration of Hydraulic Brake Device i) Overall Configuration

The hydraulic brake device 32 is a brake device that generates a braking force depending on the pressure of a hydraulic fluid, and is configured to roughly include (a) a master cylinder 42 to which a brake pedal 40, which is a brake operating member to be operated by a driver, is coupled, (b) an actuator unit 44 that supplies the hydraulic fluid from the master cylinder 42 by allowing the hydraulic fluid to pass therethrough or that regulates the pressure of the hydraulic fluid pressurized with a pump (to be described below) of the actuator unit to supply the regulated hydraulic fluid, and (c) a pair of wheel brakes 46 that is provided for the right and left front wheels 10F, respectively, to reduce the rotation of each of the right and left front wheels 10F by the pressure of the hydraulic fluid from the actuator unit 44. Incidentally, the hydraulic brake device 32 is a two-system device corresponding to the right and left front wheels 10F.

ii) Configuration of Master Cylinder

Figure 2:
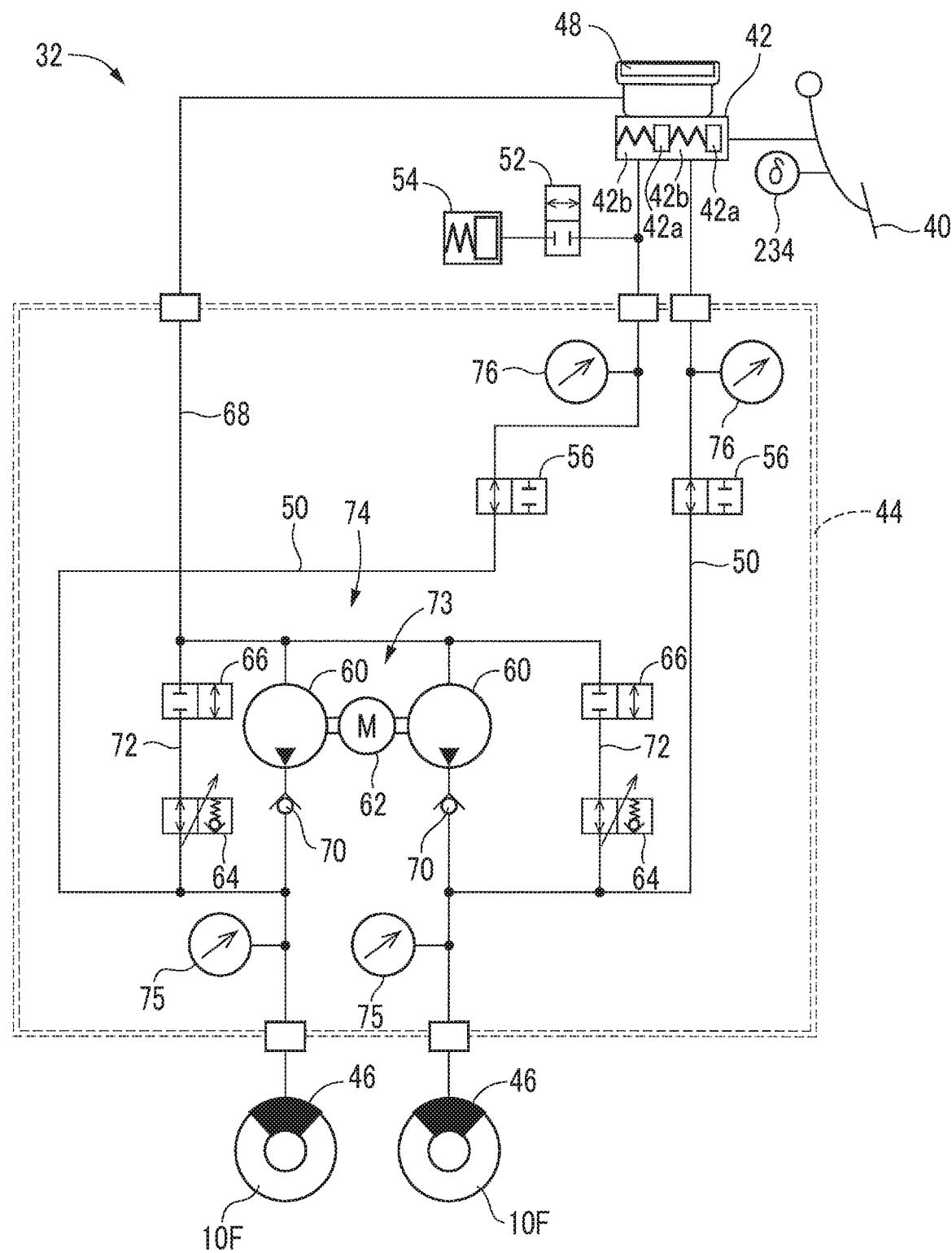
FIG. 2 is a hydraulic circuit diagram of a hydraulic brake device that constitutes the brake system illustrated in FIG. 1.

As illustrated in FIG. 2, the master cylinder 42 is a tandem type cylinder device including, inside a housing, two pistons 42a coupled to the brake pedal 40 and disposed in series with each other, and two pressurizing chambers 42b, in which the hydraulic fluid introduced thereinto is pressurized, by the movement of the pistons 42a, and a reservoir 48 serving as a low pressure source that stores the hydraulic fluid under the atmospheric pressure is attached to the master cylinder. That is, the reservoir 48 is disposed in the vicinity of the master cylinder 42, and the hydraulic fluid from the reservoir 48 is pressurized in each of the two pressurizing chambers 42b. Then, the master cylinder 42 supplies the hydraulic fluid of a pressure, according to a force (hereinafter simply also referred to as a "brake operating force") applied to the brake pedal 40, to the actuator unit 44 for two systems corresponding to the two front wheels 10F. In detail, the actuator unit 44 is provided with a pair of fluid passages that allows the hydraulic fluid supplied from the master cylinder 42 to pass therethrough and directs the hydraulic fluid to the wheel brakes 46, and the present hydraulic brake device 32 includes a pair of fluid passages, that is, a pair of master fluid passages 50 that forms portions with the fluid passages, respectively, and supplies the hydraulic fluid from the master cylinder 42 to the wheel brakes 46, respectively. That is, in the present hydraulic brake device 32, the hydraulic fluid can be supplied from the master cylinder 42 via the master fluid passages 50 to the wheel brakes 46, respectively. The wheel brakes 46 each have a wheel cylinder to be described below. In detail, the hydraulic fluid is supplied to the wheel cylinder.

A stroke simulator 54 is connected to one of the master fluid passages 50 via a simulator opening valve 52 that is a normally closed type (means a type that is brought into a valve closed state in a non-magnetized state) electromagnetic opening and closing valve. At a normal time (a case where an electrical malfunction does not occur, can also be referred to as "at an ordinary time" and "at an ordinary operation time"), the simulator opening valve 52 is magnetized and is brought into a valve opening state and the stroke simulator 54 functions. Although will be described below, at the normal time, a pair of master cut valves (master shutoff valves) 56, which is two electromagnetic opening and closing valves provided within the actuator unit 44 in correspondence with the two systems, is brought into a valve closed state. Therefore, the stroke simulator 54 guarantees the depression stroke of the brake pedal 40, and applies an operation reaction force according to the depression stroke to the brake pedal 40. That is, the stroke simulator 54 functions as means for guaranteeing the feeling of brake operation at the normal time. Since it is general that the present stroke simulator 54 is configured to include a hydraulic fluid chamber that communicates with the master fluid passage 50 and fluctuates in volume thereof, and an elastic body that exerts a force according to the amount of an increase in the volume of the hydraulic fluid chamber on the hydraulic fluid in the hydraulic fluid chamber, the detailed description of the stroke simulator 54 will be omitted herein.

iii) Configuration of Actuator Unit

The actuator unit 44 is configured to include the two master cut valves 56 that are normally open type (means a type that is brought into in a valve opening state in a non-magnetized state) electromagnetic opening and closing valves that shut off the two master fluid passages 50 described earlier, respectively, a pair of pumps 60 corresponding to the two systems, a motor 62 that drives the pumps 60, a pair of control holding valves 64 that is a pair of electromagnetic linear valves (electromagnetic control valves) corresponding to the two systems, and a pair of opening valves 66 that is two normally open type electromagnetic opening and closing valves that are disposed in series with the control holding valve 64. The present hydraulic brake device 32 is provided with solely a single reservoir, and the two pumps 60 are adapted to pump the hydraulic fluid from the reservoir 48. Therefore, a reservoir fluid passage 68 that connects the two pumps 60 and reservoirs 48 together is provided, and a portion of the reservoir fluid passage 68 is formed within the actuator unit 44. On a discharge side, the respective pumps 60 are connected to the master fluid passages 50, and are adapted to supply the pressurized hydraulic fluid to the wheel brakes 46, respectively, via respective portions of the master fluid passages 50. A check valve 70 is provided on the discharge side of each pump 60 in order to prevent a backflow of the hydraulic fluid to each pump 60. Within the actuator unit 44, a pair of return fluid passages 72 that connect the master fluid passages 50 and the reservoir fluid passage 68 together in parallel with the respective pumps 60 are formed in correspondence with the two systems, and the control holding valves 64 and the opening valves 66 are respectively provided in the return fluid passages 72. Incidentally, since the opening valves 66 are valves for opening the return fluid passages 72, the opening valves 66 may be referred to return passage opening valves 66. Since the opening valves 66 are valves that shut off the return fluid passages 72 in a non-magnetized state from a reverse viewpoint, it is also possible to understand the opening valve 66 as shutoff valves. In the present actuator unit 44, it can be considered that one pump device 73 functioning as a high pressure source device is configured to include the pumps 60 and the motor 62. It can be considered that a controlled hydraulic pressure supply device 74, that is, a pressure adjusting device for supplying the hydraulic fluid from the pump device 73 to each of the wheel brakes 46 while controlling the pressure of the hydraulic fluid is configured to include the pump device 73, the reservoir fluid passage 68 connected to the reservoir 48 without using the master cylinder 42, the return fluid passages 72, the control holding valves 64, and the return passage opening valves 66.

In correspondence with the two systems within the actuator unit 44, a pair of wheel cylinder pressure sensors 75 is provided in order to detect the pressure (hereinafter simply also referred to as "wheel cylinder pressure") of the hydraulic fluid to be supplied to each of the wheel brakes 46, and a pair of master pressure sensors 76 is provided in order to detect the pressure (hereinafter simply also referred to as "master pressure") of the hydraulic fluid to be supplied from the master cylinder 42.

iv) Configuration of Wheel Brake

Figure 3:
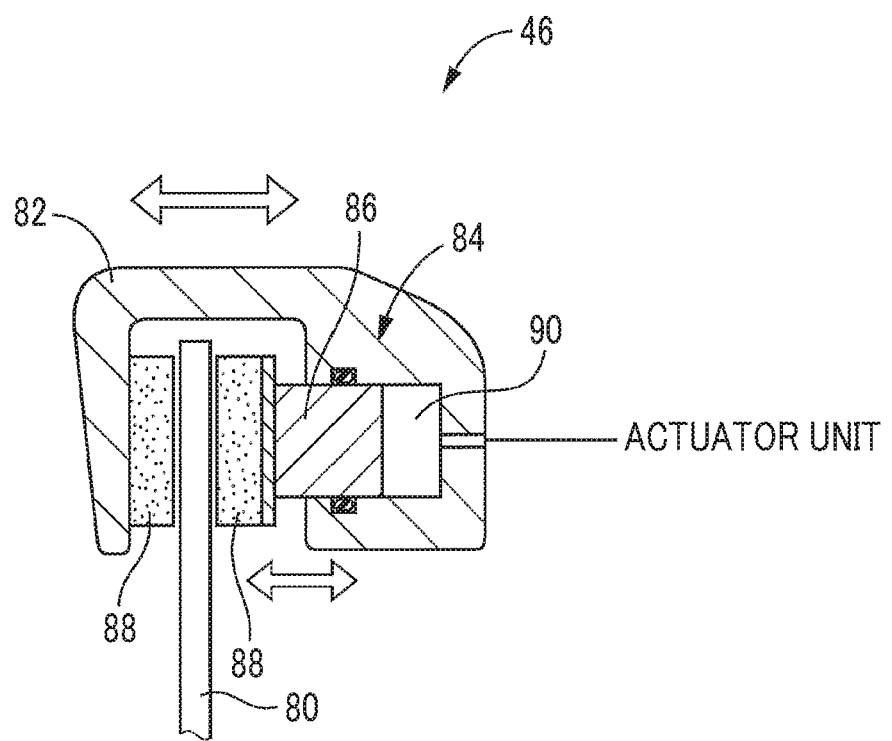
FIG. 3 is a sectional view illustrating wheel brakes of the hydraulic brake device that constitutes the brake system illustrated in FIG. 1.

The wheel brake 46 for stopping the rotation of each of the front wheels 10F is a disc brake device as schematically illustrated in FIG. 3. The wheel brake 46 is configured to include a disc rotor 80 serving as a rotating body that rotates integrally with the front wheel 10F, and a caliper 82 that is movably supported by a carrier that rotatably holds the front wheel 10F. A wheel cylinder 84 is incorporated in the caliper 82. A portion of the caliper 82 serves as a housing of the wheel cylinder 84. A pair of brake pads (types of friction members) 88 is provided in the caliper 82. One of the brake pads 88 is secured to the distal end side of a piston 86 included in the wheel cylinder 84. The other one of the brake pads 88 is secured to a portion of the caliper 82. The portion of the caliper 82 to which the brake pad 88 is secured is opposed to the portion of the caliper 82 in which the wheel cylinder 84 is incorporated. The two brake pads 88 face each other with the disc rotor 80 interposed therebetween.

The hydraulic fluid from the actuator unit 44 is supplied to a hydraulic fluid chamber 90 of the wheel cylinder 84, and the brake pads 88 sandwich the disc rotor 80 with the pressure of the hydraulic fluid. That is, the brake pads 88 that are friction members are pressed against the disc rotor 80 by the operation of the wheel cylinder 84. As described above, the wheel brake 46 generates a braking force For stopping the rotation of the front wheel 10F, that is, a braking force For braking the vehicle (hereinafter simply also referred to as a "hydraulic braking force"), using a frictional force. The hydraulic braking force has a magnitude according to the pressure of the hydraulic fluid to be supplied from the actuator unit 44. Since the wheel brake 46 has a general structure, the detailed description of the wheel brake 46 will be described.

v) Operation of Hydraulic Brake Device

At the normal time, the two master cut valves 56 of the actuator unit 44 are brought into the valve closed state, the opening valves 66 are brought into a valve opening state, the pressure of the hydraulic fluid from the pump device 73 is adjusted by the controlled hydraulic pressure supply device 74, and the adjusted hydraulic fluid is supplied to the wheel brakes 46. Specifically, in principle, when a braking force request for the hydraulic brake device 32 is generated in view of the power consumption of the hydraulic brake device 32, driving of the pumps 60 is started, and supply of an electric current to the control holding valves 64 that are electromagnetic linear valves are controlled. Accordingly, the pressure of the hydraulic fluid to be supplied to the wheel brakes 46 are set a pressure according to the request of the hydraulic braking force. As a result, the hydraulic braking force of a magnitude according to the braking force request is generated.

Meanwhile, in a case where an electrical malfunction occurs in view of fail-safe, the master cut valves 56 are brought into the valve opening state, the opening valves 66 are brought into a valve closed state, the hydraulic fluid from the master cylinder 42 is supplied to the wheel brakes 46, and a driver's force to be added to the brake pedal 40, that is, generation of the hydraulic braking force of a magnitude according to the brake operating force is enabled.

[D] Configuration of Electric Brake Device

Figure 4:
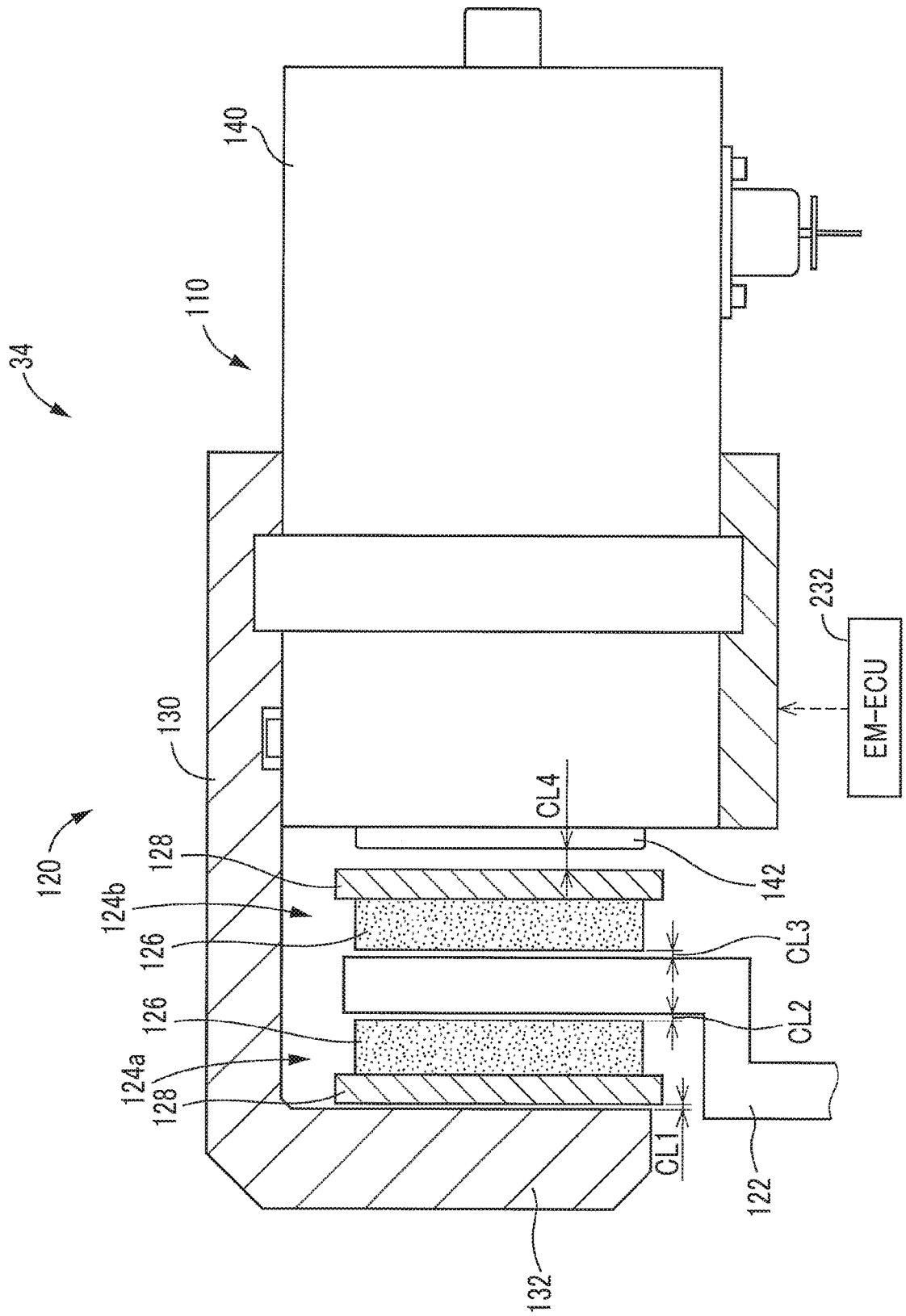
FIG. 4 is a sectional view illustrating an electric brake device that constitutes the brake system illustrated in FIG. 1.

Each of the electric brake devices 34 is a brake device that generates a braking force depending on the force of the electric motor, and as illustrated in FIG. 4, is configured to include a brake caliper 120 (hereinafter simply also referred to as a "caliper 120") in which an actuator 110 is disposed as a central constituent element, and a disc rotor 122 serving as a rotating body that rotates with a wheel (a present embodiment rear wheel).

i) Configuration of Brake Caliper

The caliper 120 is held in a movable manner in an axial direction (rightward-leftward direction of the drawing) on a mount (the illustration thereof is omitted) provided in a carrier (the illustration thereof is omitted) that rotatably holds a wheel so as to straddle the disc rotor 122. A pair of brake pads (hereinafter simply also referred to as "pads") 124a, 124b is held on the mount so as to sandwich the disc rotor 122 in a state where the movement thereof in the axial direction is allowed. Each of the pads 124a, 124b is configured to include a friction member 126 located in contact with the disc rotor 122, and a backup plate 128 that supports the friction member 126. The pads 124a, 124b themselves can also be considered as friction members.

For convenience, when the left in the drawing is described as the front and the right in the drawing is described as the rear, the pad 124a on the front side is supported by a claw part 132 that is a front end part of a caliper body 130. The actuator 110 is held such that a housing 140 of the actuator 110 is fixed to a portion on a rear side of the caliper body 130. The actuator 110 has a piston 142 that moves forward and backward with respect to the housing 140, and the piston 142 moves forward, and thereby, a front end part, in detail, a front end thereof engages with the pad 124b on the rear side, in detail, the backup plate 128 of the pad 124b. Then, as the piston 142 further moves forward in an engaged state, and thereby, the pads 124a, 124b sandwich the disc rotor 122. In other words, the friction member 126 of each of the pad 124a, 124b is pressed against the disc rotor 122. A braking force for the rotation of the wheel, that is, a braking force for decelerating and stopping the vehicle is generated depending on a frictional force between the disc rotor 122 and the friction member 126 by the above-described pressing.

ii) Structure of Actuator

Figure 5:
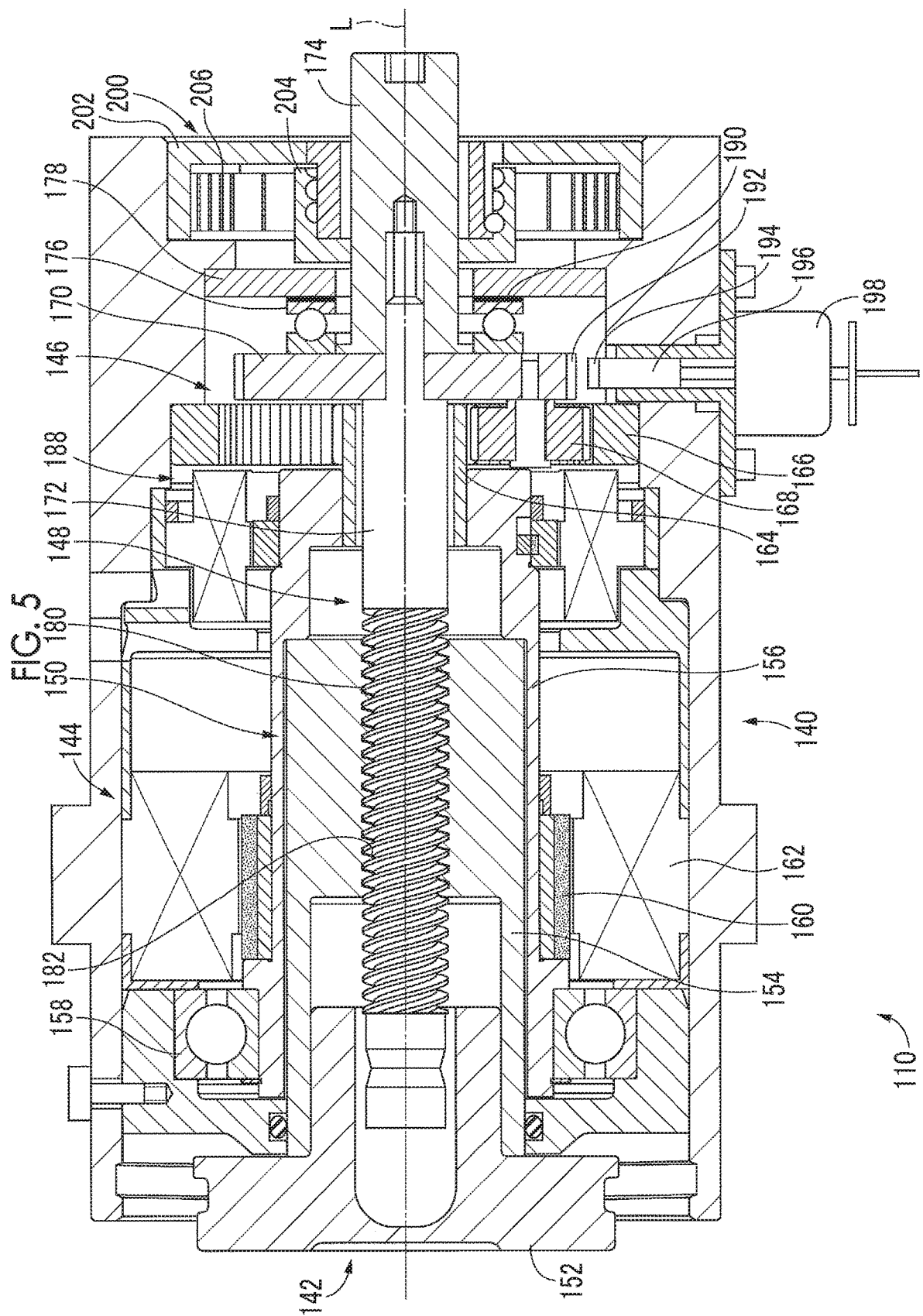
FIG. 5 is a sectional view illustrating an actuator that constitutes the electric brake device illustrated in FIG. 4.

As illustrated in FIG. 5, the actuator 110 is configured to include an electric motor 144 serving as a drive source, a speed reducing mechanism 146 for reducing the rotational speed of the electric motor 144, an input shaft 148 rotated by the rotation of the electric motor 144 reduced in speed via the speed reducing mechanism 146, an operation conversion mechanism 150 that converts the rotation of the input shaft 148, that is, the rotation of the electric motor 144, into the forward and backward movement of the piston 142, and the like in addition to the housing 140 and the piston 142. In the following description, for convenience, the left of the drawing is referred to as the front, the right of the drawing is referred to as the rear, the movement of the piston 142 to the left is referred to as forward movement, and the movement of the piston 142 to the right is referred to as backward movement. Moreover, the rotation of the input shaft 148 and the electric motor in a direction in which the piston 142 is moved forward is referred to as normal rotation, and the rotation of the input shaft 148 and the electric motor in a direction in which the piston 142 is moved backward is referred to as reverse rotation.

The piston 142 is configured to include a piston head 152, and an output cylinder 154 that is a hollow tube part of the piston 142, while the electric motor 144 has a cylindrical rotational driving shaft 156. The output cylinder 154 is disposed inside the rotational driving shaft 156 and the input shaft 148 are respectively inside the output cylinder 154 such that the output cylinder 154 and the input shaft 148 are disposed so as to be coaxial with each other. In detail, the rotational driving shaft 156, the output cylinder 154, and the input shaft 148 are disposed such that the axes thereof become an axis L that is an axis common thereto. As a result, the present actuator 110 is made compact.

The rotational driving shaft 156 is held by the housing 140 so as to be rotatable via a radial bearing 158 and immovable in the axial direction (a direction in which the axis L extends, and a rightward-leftward direction in the drawing). The electric motor 144 is configured to include magnets 160 disposed on the whole circumference at an outer periphery of the rotational driving shaft 156, and a coil 162 fixed to an inner periphery of the housing 140 so as to surround the magnets 160.

The speed reducing mechanism 146 is a planetary gear type speed reducing mechanism configured to include a hollow sun gear 164 fixedly attached to a rear end of the rotational driving shaft 156, a ring gear 166 fixed to the housing 140, and a plurality of planetary gears 168 (solely one is illustrated in the drawing) that meshes with the sun gear 164 and the ring gear 166 and revolve around the sun gear 164. Each of the planetary gears 168 is held by a flange 170 serving as a carrier so as to be rotatable on its axis. The input shaft 148 is formed such a front shaft 172 constituting a portion on a front side thereof and a rear shaft 174 constituting a portion on the rear side thereof are threadedly engaged with each other, and the flange 170 is sandwiched and fixed between the front shaft 172 and the rear shaft 174 and thereby, rotates integrally with the front shaft 172 and the rear shaft 174, that is, integrally with the input shaft 148. The rotation of the rotational driving shaft 156, that is, the rotation of the electric motor 144, is reduced in speed and transmitted as the rotation of the input shaft 148 via the speed reducing mechanism 146 configured as described above. Incidentally, the input shaft 148 is supported by the housing 140 via the flange 170, a thrust bearing 176, and a support plate 178 so as to be rotatable and immovable in the axial direction.

A male screw 180 is formed at an outer periphery of the front shaft 172 of the input shaft 148, while a female screw 182 threadedly engaged with the male screw 180 is formed inside the output cylinder 154. That is, the input shaft 148 in which the male screw 180 is formed functions as a rotating member that is rotatable by the rotation of the electric motor 144, the output cylinder 154 in which the female screw 182 is formed functions as a linear motion member is made to be movable forward and backward in order to move the piston 142 forward and backward, the operation conversion mechanism 150 is configured to include the input shaft 148 and the output cylinder 154. Incidentally, in the present actuator 110, it can be considered that the linear motion member and the piston are integrated with each other.

Trapezoidal screws are adopted as screws having relatively high strength for the male screw 180 and the female screw 182, and grease for smoothing the operation of the operation conversion mechanism 150, that is, the operation of the actuator 110 is interposed as a lubricant between the male screw 180 and the female screw 182. Although the operation conversion mechanism in which the male screw is formed in the rotating member and the female screw is formed in the linear motion member is adopted in the present actuator 110, it is also possible to form the actuator by adopting an operation conversion mechanism in which the female screw is formed in the rotating member and the male screw is formed in the linear motion member.

As can be understood from the above description, in the present actuator 110, the piston 142 is moved forward and backward by rotating the electric motor 144. The state illustrated in the drawing is a state where the piston 142 is located at a position (hereinafter simply also referred to as "set backward movement end position") closest to a rear end side in a movable range. In detail, when the electric motor 144 is normally rotated from this state, the piston 142 moves forward, and as can be understood in FIG. 4, the pads 124a, 124b are pressed against the disc rotor 122 in a state where a front end of the piston 142 engages with the pad 124b, and a braking force is generated. Incidentally, the magnitude of the braking force is a magnitude according to an electric current to be supplied to the electric motor 144. Thereafter, when the electric motor 144 is reversely rotated, the piston 142 moves backward, the engagement between the piston 142 and the pad 124b is released, is brought into a state where no braking force is generated, and finally, the piston 142 returns to a set backward movement end position illustrated in FIG. 5.

In addition to the constituent elements described above, in the present actuator 110, a resolver 188 is provided as a motor rotational angle sensor for detecting the rotational angle of the electric motor 144. It is possible to detect the position and the movement distance of the piston 142 in the axial direction, strictly, the rotational position of the input shaft 148, based on the detection signal of the resolver 188. An axial force sensor 190 (load cell) for detecting a force in a thrust direction, that is, an axial force (axial load) that acts on the input shaft 148 is disposed between the support plate 178 and the thrust bearing 176. This axial force is equivalent to a force with which the piston 142 presses the brake pad 124b against the disc rotor 122, and it is possible to detect the braking force generated from the electric brake device 34, based on a detection value of the axial force sensor 190.

In the present actuator 110, a mechanism for prohibiting the rotation of the input shaft 148 is also provided in order to exhibit a function as an electric parking brake. In detail, a ratchet gear tooth 192 is formed at an outer periphery of the flange 170, while a tip of the flange 170 is provided with a plunger 196 having a locking claw 194 for locking the ratchet gear tooth 192, and a solenoid 198 fixed to an outer periphery of the housing 140 to move the plunger 196 forward and backward. The electric motor 144 is normally rotated to move the piston 142 forward and lock the ratchet gear tooth 192 to the locking claw 194, in a state where the solenoid 198 is magnetized to project the plunger 196. Even when the magnetization of the solenoid 198 is released in the locked state, the backward movement of the piston 142 is prohibited. In a case where the locking is released by the locking claw 194, the electric motor 144 may be normally rotated with the solenoid 198 being brought into a non-magnetized state.

For example, in a case where an electric current to the electric motor 144 is shut off in a state where the piston 142 is moving forward and a braking force is generated, the piston 142 cannot be moved backward, and the state where the braking force is generated continues. Supposing such a case, the present actuator 110 includes a mechanism that moves the piston 142 backward with an elastic force exhibited from the elastic body, that is, a biasing mechanism 200 that applies a rotation biasing force (may also be referred to as "rotary torque"), in a direction in which the piston 142 moves backward, to the input shaft 148.

Figure 6A:
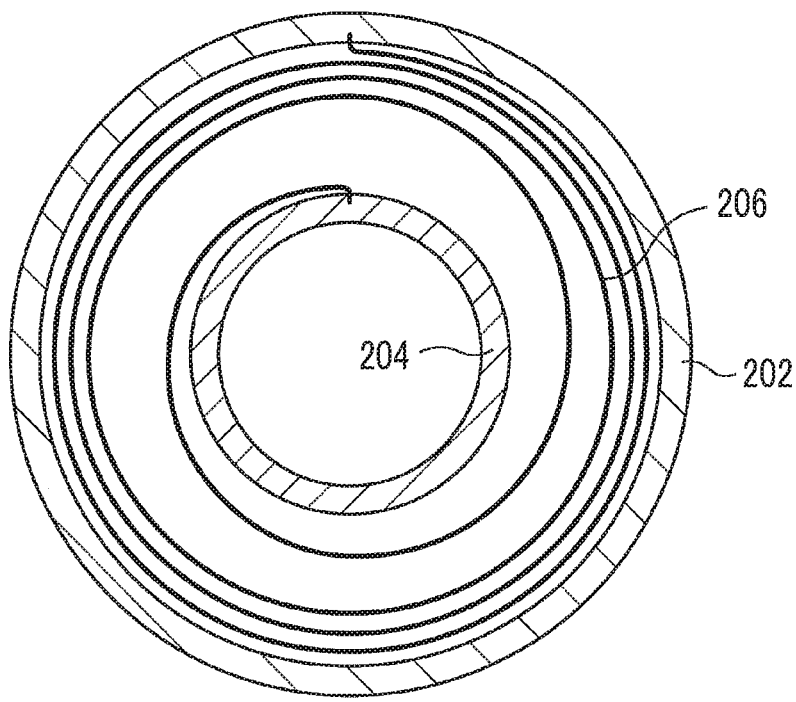
FIG. 6A is a supplementary view for illustrating a biasing mechanism of the actuator illustrated in FIG. 5.
Figure 6B:
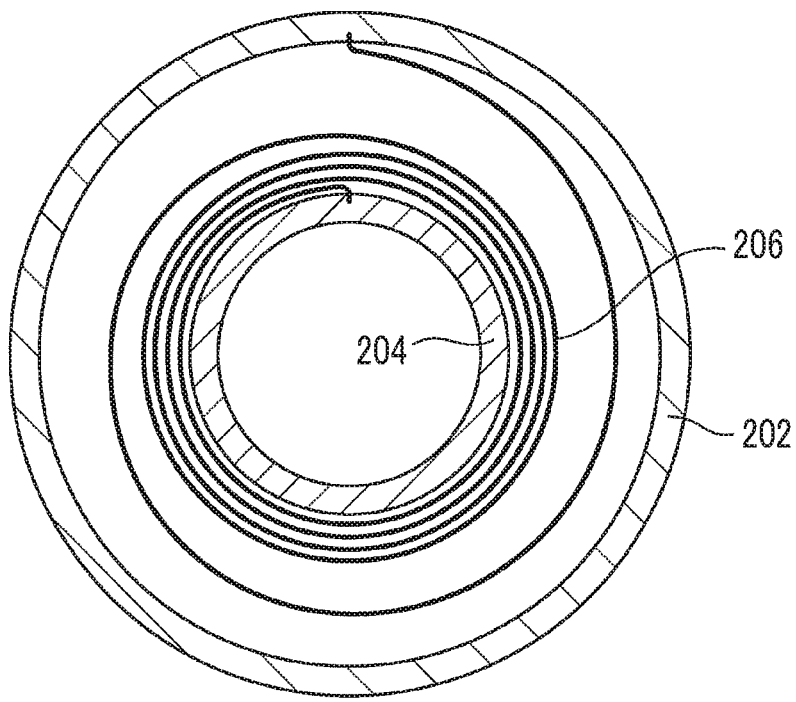
FIG. 6B is a supplementary view for illustrating a biasing mechanism of the actuator illustrated in FIG. 5.

More specifically, the biasing mechanism 200 is configured to include an outer ring 202 fixed to the housing 140, an inner ring 204 fixed to the rear shaft 174 of the input shaft 148 so as to rotate integrally with the input shaft and disposed inside the outer ring 202, and a spiral spring (may be referred to as "a flat spiral spring" or a "power spring") 206 serving as an elastic body disposed between portions facing the other in each of the outer ring 202 and the inner ring 204. The spiral spring 206 is hardly elastically deformed as illustrated in FIG. 6A in a state illustrated in FIG. 5, that is, in a state where the piston 142, is located at the above-described set backward movement end position, and the spiral spring 206 is brought into a state where an elastic force is not generally generated. As the input shaft 148 is rotated and a piston 142 is moved forward by the electric motor 144 from the above-described state, as illustrated in FIG. 6B, the spiral spring 206 is gradually wound and fastened to generate the elastic force. That is, the elastic force of a magnitude according to a forward movement amount by which the piston 142 moved forward from the set backward movement end position acts as a biasing force that resists the forward movement of the piston 142, that is a biasing force in a direction where the piston 142 is moved backward. In other words, a biasing force that is exerted on the input shaft 148 by the spiral spring 206 is increased as the piston 142 is moved forward. The piston 142 can be moved backward even in a case where the piston 142 cannot be moved backward by the electric motor 144 in a state where the piston 142 is moving forward by the rotation biasing force as described above to generate the braking force.

In the operation conversion mechanism 150 described earlier, reverse efficiency (efficiency when the input shaft 148 is rotated by the forward and backward movement of a piston 142) is smaller compared to normal efficiency (efficiency when the piston 142 is moved forward and backward by the rotation of the input shaft 148). However, since the lead angles of the male screw 180 and the female screw 182 are enlarged to some extent, a reverse efficiency having a certain degree of magnitude is given. Hence, in a case where the piston 142 is intended to be maintained at an intermediate position of the movable range, solely an electric current enough to generate a force that resists the biasing force caused by the biasing mechanism 200 is supplied to the electric motor 144.

Under the configuration described above, the electric brake device 34 generates a braking force For stopping the rotation of the rear wheel 10R, that is, a braking force For braking the vehicle (hereinafter simply also referred to as an "electric braking force"), using a frictional force. As illustrated in FIG. 1, an electric current is supplied from an auxiliary machine battery 220, which is a battery separate from the battery 28, to the electric motor 144 of each of the electric brake devices 34.

[E] Basic control of Brake System i) Control System

The control of the present brake system, in detail, the control of a braking force F (a generic name of various braking forces) is performed the control system illustrated in FIG. 1. Specifically, the control of the hydraulic brake device 32 is performed by the electronic control unit 230 for the hydraulic brake device (hereinafter simply also referred to as an "HY-ECU"), and the control of each electric brake device 34 is performed by an electronic control unit 232 for the electric brake device (hereinafter simply also referred as an "EM-ECU") that is a constituent element of each electric brake device 34. The HY-ECU 230 is configured to include a computer, drivers (drive circuits) for respective devices that constitute the hydraulic brake device 32, an inverter, and the like. The EM-ECU 232 functions as a controller in the electric brake device 34, and is configured to include a computer, drivers (drive circuits) for respective devices that constitute the electric brake device 34, an inverter, and the like. As described earlier, the control of the regenerative brake device 30 is performed by the HB-ECU 29.

More specifically, the HB-ECU 29 performs the control of inverters 26G, 26M constituting the regenerative brake device 30, the HY-ECU 230 performs the control of the master cut valves 56, the control holding valves 64, the return passage opening valves 66, and the motor 62 of the pump device 73 that the actuator unit 44 constituting the hydraulic brake device 32 has, and the EM-ECU 232 performs the controls the electric motor 144 of the electric brake device 34, thereby controlling a regenerative braking force $F_{RG}$ for the front wheels 10F, a hydraulic braking force $F_{HY}$ for the front wheels 10F, and an electric braking force $F_{EM}$ for each of the two rear wheels 10R. As described above, a summed braked force $F_{SUM}$ that is a braking force F to be applied to the entire vehicle is controlled. In the present vehicular brake system, the HB-ECU 29, the HY-ECU 230, and the EM-ECU 232 are connected to each other in a network (CAN) within the vehicle, and are adapted to have respective kinds of control. The HY-ECU 230 functions as a main electronic control unit that also supervises the HB-ECU 29 and the EM-ECU 232, in the present brake system, as will be described below.

The vehicle on which the present brake system is mounted is adapted to be capable of performing automatic traveling while following a preceding vehicle or avoiding collision of the vehicle. That is, the vehicle has an autonomous operation system that enables an autonomous operation of the vehicle (may also be referred to as "autonomous driving"), and a vehicle autonomous operation electronic control unit (hereinafter simply also referred to as "AO-ECU") 233 that forms the core of the system is mounted on the vehicle. The AO-ECU 233 performs the autonomous operation of the vehicle based on the information from a peripheral monitoring system (may also be considered to be a portion of the autonomous operation system) provided in the vehicle. In the autonomous operation, for example, in a case where the distance between vehicles with respect to a preceding vehicle is shortened or the possibility of collision against an obstacle increases, a braking request that is not based on a driver's intention, that is, a request for automatic braking is made. This request is transmitted as a signal regarding a needed summed braked force $F_{SUM}$ (to be described below) from the AO-ECU 233 to the HY-ECU 230. Incidentally, one controller of the brake system is configured to include the HB-ECU 29, the HY-ECU 230, the EM-ECU 232, and the AO-ECU 233, and it can also be considered that a portion of the controller functions as a controller of the electric brake device 34.

ii) Basic Control of Braking Force

Basic control (hereinafter simply also referred to as "braking force control") of a braking force in the present brake system is performed as follows. A braking force request intended by the driver is acquired based on a brake operation amount δ that indexes the request. In the present brake system, as illustrated in FIG. 1, a stroke sensor 234 for detecting the stroke amount of the brake pedal 40 as the brake operation amount δ is provided, and a driver's braking force request for the entire vehicle, that is, a needed summed braked force $F_{SUM}^*$, which is the braking force F (the sum of braking forces F applied to the four wheels 10) needed for the entire vehicle, is determined based on the detected brake operation amount δ. Incidentally, an operating force applied to the brake pedal 40 by the driver, that is, the brake operating force can also be an index of the braking force request.

In a case where the automatic braking is needed, in the AO-ECU 233, the needed summed braked force $F_{SUM}^*$ is determined, and information on the determined needed summed braked force $F_{SUM}^*$ is transmitted from the AO-ECU 233 to the HY-ECU 230. In that case, the HY-ECU 230 performs the following processing based on the needed summed braked force $F_{SUM}^*$ based on the received information.

In the present vehicular brake system, broadly, the regenerative braking force $F_{RG}$ is preferentially generated, and a deficient braking force $F_{IS}$, which cannot be covered by the regenerative braking force $F_{RG}$ of the needed summed braked force $F_{SUM}^*$, is covered by the hydraulic braking force $F_{HY}$ and the electric braking force $F_{EM}$. Incidentally, hereinafter, in order to simplify description, the regenerative braking force $F_{RG}$ and the hydraulic braking force $F_{HY}$ are respectively considered as the sum of braking forces F applied to the two front wheels 10F by the regenerative brake device 30 and the hydraulic brake device 32. Meanwhile, the electric braking force $F_{EM}$ is considered as braking forces that are individually applied to the two rear wheels 10R by the respective electric brake devices 34, and the sum of individual electric braking forces $F_{EM}$ (hereinafter simply also referred to as "two electric braking forces $F_{EM}$") applied to the two rear wheels 10R is applied to the entire vehicle.

A signal regarding a maximum regenerative braking force $F_{RG-MAX}$ that is the regenerative braking force $F_{RG}$ that can be generated at a predetermined point of time is transmitted from the HY-ECU 230 to the HB-ECU 29. The HY-ECU 230 determines the maximum regenerative braking force $F_{RG-MAX}$ in a range that does not exceed the needed summed braked force $F_{SUM}^*$ and does not exceed the maximum regenerative braking force $F_{RG-MAX}$ as a target regenerative braking force $F_{RG}^*$. Next, the HY-ECU 230 subtracts the target regenerative braking force $F_{RG}^*$ from the needed summed braked force $F_{SUM}^*$, thereby determining the deficient braking force $F_{IS}$. In order to cover the deficient braking force $F_{IS}$ by the hydraulic braking force $F_{HY}$ and the two electric braking forces $F_{EM}$, in detail, in order to cover the deficient braking force $F_{IS}$ so as to obtain a distribution ratio ($\beta_{HY}:\beta_{EM}$) in which the sum of the hydraulic braking force $F_{HY}$ and the two electric braking forces $F_{EM}$ are set, the HY-ECU 230 multiplies the deficient braking force $F_{IS}$ by a hydraulic braking force distribution coefficient $\beta_{HY}$ and an electric braking force distribution coefficient $\beta_{EM}$ ($\beta_{HY}$+$\beta_{EM}$=1), respectively, thereby determining a target hydraulic braking force $F_{HY}*$ and target electric braking forces $F_{EM}*$ as the hydraulic braking force $F_{HY}$ and the respective electric braking forces $F_{EM}$ to be generated. Signals regarding the target electric braking forces $F_{EM}*$ are transmitted from the HY-ECU 230 to the EM-ECU 232. Incidentally, in order to simplify description, in principle, it is supposed that the electric braking forces $F_{EM}$ for the right and left rear wheels 10R are equal to each other, and the target electric braking forces $F_{EM}*$ are also determined to be equal to each other unless otherwise mentioned.

The regenerative brake device 30, the hydraulic brake device 32, and the two electric brake devices 34 are controlled based on the target regenerative braking force $F_{RG}*$, the target hydraulic braking force $F_{HY}*$, and the target electric braking forces $F_{EM}*$, respectively. In detail, a signal regarding the target regenerative braking force $F_{RG}*$ is sent to the HB-ECU 29, the HB-ECU 29 controls the inverter 26M such that the regenerative braking force $F_{RG}$ becomes the target regenerative braking force $F_{RG}*$, the HY-ECU 230 controls electric currents to be supplied to the control holding valves 64 such that the hydraulic braking force $F_{HY}$ becomes the target hydraulic braking force $F_{HY}*$, the respective EM-ECU 232s of the two electric brake devices 34 control a supply electric current I to the electric motor 144 such that an electric braking force $F_{EM}$ for one corresponding rear wheel 10R becomes a target electric braking force $F_{EM}*$.

Regarding the hydraulic braking force $F_{HY}$, specifically, although being repeated, a set electric current is supplied to the motor 62 unless the needed summed braked force $F_{SUM}*$ is 0, and electric currents to be supplied to the control holding valves 64 are controlled such that wheel cylinder pressures $P_W$ detected by the wheel cylinder pressure sensors 75 becomes target wheel cylinder pressures $P_W*$ determined based on the target hydraulic braking force $F_{HY}*$. Regarding the electric braking forces $F_{EM}$, specifically, an electric current to be supplied to the electric motor 144 is controlled such that an axial force (thrust load) WS detected by the axial force sensor 190 becomes a target axial force $W_S*$ determined based on the target electric braking forces $F_{EM}*$.

According to the braking force request dependence control, the regenerative braking force $F_{RG}$, the hydraulic braking force $F_{HY}$, and the respective electric braking forces $F_{EM}$ are controlled so as to cooperate with each other. Specifically, the regenerative braking force $F_{RG}$, the hydraulic braking force $F_{HY}$, and the electric braking forces $F_{EM}$ are cooperatively controlled so as to cover the deficient braking force $F_{IS}$, which cannot be covered by the regenerative braking force $F_{RG}$ of the needed summed braked force $F_{SUM}*$, with the hydraulic braking force $F_{HY}$ for the front wheels 10F and the electric braking forces $F_{EM}$ for the two respective rear wheels 10R. By virtue of the cooperative control as described above, it is possible to simply maintain a suitable needed summed braked force, for example, even in a case where a vehicle traveling speed or the charge state of the battery 28 fluctuates and the regenerative braking force fluctuates. The hydraulic braking force $F_{HY}$ and the electric braking forces $F_{EM}$ are cooperatively controlled such that the hydraulic braking force $F_{HY}$ and the electric braking forces $F_{EM}$ for the two rear wheels 10R are generated in a set distribution ratio ($\beta_{HY}$:$\beta_{EM}$). According to such cooperative control, since the braking forces F can be controlled in accordance with a simple control law, it is possible to easily control suitable braking forces F needed for the entire vehicle.

[F] Responsiveness of Electric Brake Device and Prevention of Dragging Phenomenon Some time lag is present in any brake devices until an actual braking force is generated after a braking force request. It can be said that the responsiveness is better as this time lag is shorter. In a case where the braking force request fluctuates, it is needed that it is also excellent, that the actual braking force follows the fluctuation without delay, that is, the followability is excellent in order to realize excellent responsiveness. From the viewpoint as described above, since the hydraulic brake device 32 of the brake system operate each pump 60 when a braking force request occurs as described earlier, the time lag is large. Due to the fact that a portion ranging from the actuator unit 44 to each wheel brake 46 is connected by relatively long hydraulic fluid conduits, the pressure loss of the hydraulic fluid is large and the followability is inferior to some extent. In contrast, each electric brake device 34 can control a braking force simply by controlling a supply electric current to the electric motor 144. Hence, when the electric brake device 34 and the hydraulic brake device 32 are compared with each other in responsiveness, generally, the responsiveness of the electric brake device 34 surpasses the responsiveness of the hydraulic brake device 32.

Meanwhile, this is also true for each wheel brake 46 of the hydraulic brake device 32. However, when a braking force request does not occur in the electric brake device 34, in order to avoid a phenomenon in which the vehicle travels in a state the friction members 126 of the brake pads 124a, 124b are pressed against the disc rotor 122, that is, a so-called dragging phenomenon, the piston 142, that is, the output cylinder 154 that is a linear motion member, is located such that a certain amount of clearance CL is provided between the friction members 126 and the disc rotor 122. Incidentally, strictly, the clearance CL can be considered as the sum of four gaps illustrated in FIG. 4, that is, a gap CL1 between the claw part 132 of the caliper body 130 and the backup plate 128 of the brake pad 124a, a gap CL2 between the friction member 126 of the brake pad 124a and the disc rotor 122, a gap CL3 between the disc rotor 122 and the friction member 126 of the brake pad 124b, and a gap CL4 between the backup plate 128 of the brake pad 124b and the piston 142. In FIG. 4, the clearances CL1 to CL4 are drawn in an exaggerated manner.

In consideration of the above-described responsiveness, it is desirable that the clearance CL is as small as possible. In the present electric brake device 34, when there is no braking force request, the output cylinder 154 is allowed to be located at a position where the clearance CL as small as possible is present such a degree that a dragging phenomenon does not occur, by the control of the electric motor 144 based on a detection value of the resolver 188. In the following description, a position (can also be considered as the position of the piston 142) in a forward-backward movement direction of the output cylinder 154 when the clearance CL as small as possible is present is referred to as a "standby position", and the control of locating the output cylinder 154 at the standby position, strictly, the control of allowing the output cylinder 154 to be located at the standby position and prohibiting the backward movement of the output cylinder 154 from the standby position is referred to as "standby control".

[G] Lubrication of Grease in Electric Brake Device, Standby Control, Backward Movement Control In the electric brake device 34, as described earlier, a screw mechanism constituted of the male screw 180 formed in the input shaft 148 and the female screw 182 formed in the output cylinder 154 is adopted in the operation conversion mechanism 150 of the actuator 110. The male screw 180 and the female screw 182 are trapezoidal screws, and as illustrated in sectional views in FIG. 7, are threadedly engaged with each other in a state where grease 250 that is a lubricant is interposed therebetween.

Figure 7:
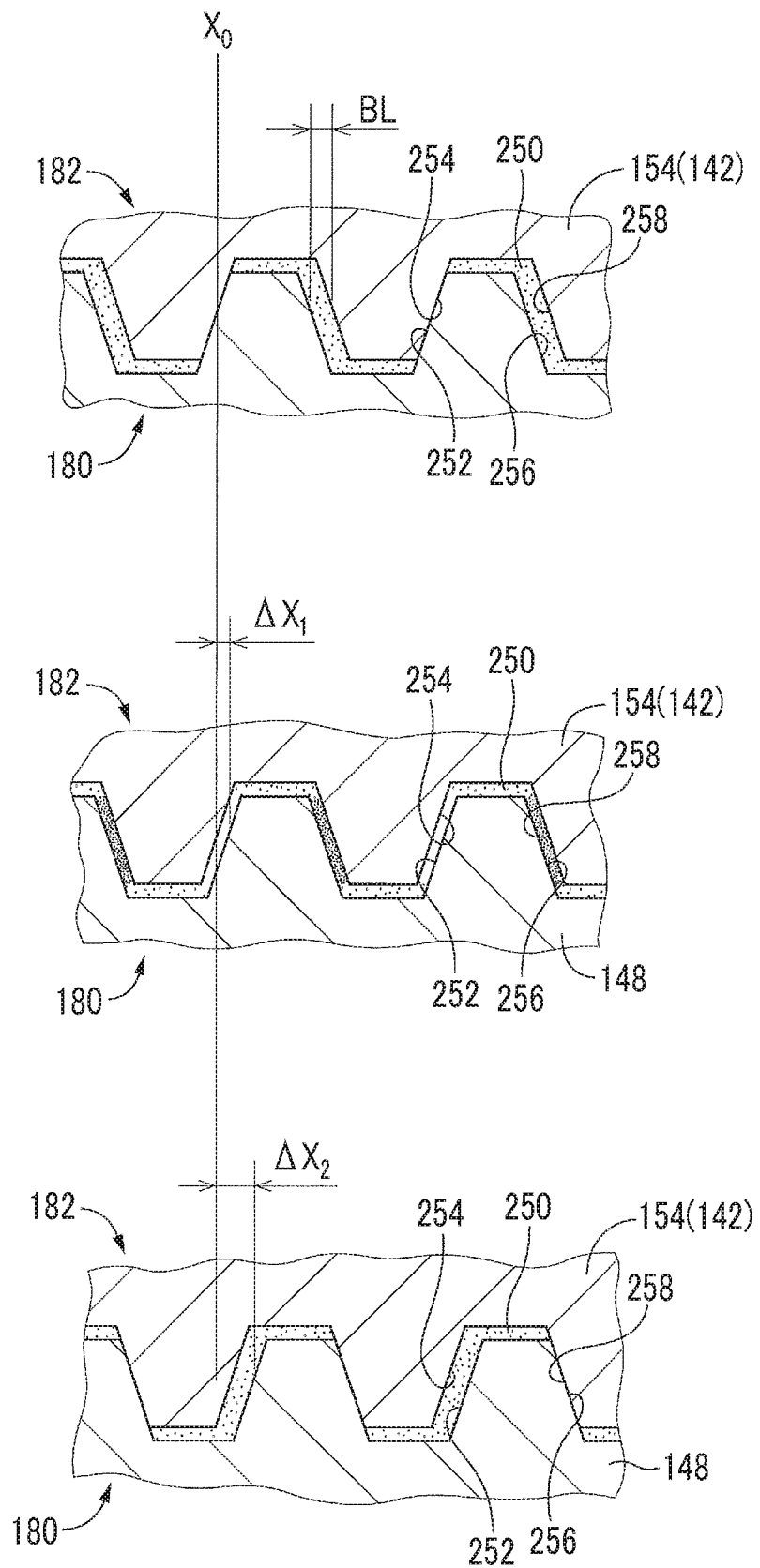
FIG. 7 is a sectional view of a male screw and a female screw for illustrating a threaded engagement relationship between the male screw of an input shaft and the female screw of an output cylinder adopted in an operation conversion mechanism of the actuator of the electric brake device.

The first of FIG. 7 illustrates a state where the electric motor 144, that is, the input shaft 148, is normally rotated and the piston 142, that is, the output cylinder 154, is moved forward or a state where the brake pads 124a, 124b are pressed against the disc rotor 122 and a braking force is generated by the piston 142. In those states, a front-side surface of a screw ridge of the male screw 180 (hereinafter simply also referred to as a "front ridge surface 252") and a front-side surface (hereinafter simply also referred to as a "front groove surface 254") of a screw groove of the female screw 182 facing with the front ridge surface 252 come into contact with each other, while a gap is present between a rear-side surface (hereinafter simply also referred to as a "rear ridge surface 256") of a screw ridge of the male screw 180 and a rear-side surface (hereinafter simply also referred to as a "rear groove surface 258") of a screw groove of the female screw 182 facing the rear ridge surface 256. That is, a backlash of an amount equivalent to the spacing between the rear ridge surface 256 and the rear groove surface 258 in the first of FIG. 7 is present between the male screw 180 and the female screw 182. When this amount is referred to as a backlash amount BL, the backlash amount BL is relatively large as the male screw 180 and the female screw 182 are trapezoidal screws. In other words, a relatively large backlash is present in the actuator 110 of the electric brake device 34.

As described earlier, from a viewpoint of responsiveness, it is desirable that the clearance CL in a case where the output cylinder 154 is located at the standby position is as small as possible unless the dragging phenomenon occurs. For that reason, in the present electric brake device 34, the clearance CL is set so as to be smaller than the backlash amount BL in a state where the output cylinder 154, that is, the piston 142, is located at the standby position. That is, in the standby control, in a process in which a braking force request decreases, the input shaft 148, that is, the electric motor 144 is operated to reversely rotate from a position where no braking force is generated to such a rotational position that the backward movement (hereinafter simply also referred to as a "braking force disappearance position $X_0$") of the output cylinder 154 with respect to the input shaft 148 by a first setting distance $\Delta X_1$ (<BL) is allowed, in other words, the output cylinder 154 does not move backward with respect to the input shaft 148 solely by the first setting distance $\Delta X_1$. The position after the electric motor 144 performs such a rotational operation is a position illustrated in the second of FIG. 7. Incidentally, in the second of FIG. 7, a relative position between the input shaft 148 and the output cylinder 154 when the first setting distance $\Delta X_1$ is set to half of the backlash amount BL is drawn. In actual vehicle traveling, since the output cylinder 154 is moved backward by a force with which the disc rotor 122 pushes the brake pads 124a, 124b back, it can be said that the second of FIG. 7 illustrates a state where the output cylinder 154 is moved backward with respect to the input shaft 148 by the first setting distance $\Delta X_1$ that is the maximum distance allowed to move backward.

As described earlier, the grease 250 is interposed between the male screw 180 and the female screw 182. However, in the state illustrated in the first of FIG. 7, the grease 250 is pushed out from between the front ridge surface 252 and the front groove surface 254 and is unevenly distributed between the rear ridge surface 256 and the rear groove surface 258. Conversely in a bright expression, a state where grease is hardly present between front ridge surface 252 and front groove surface 254 is brought about. When this state lasts for a relatively long time, the lubricity between the front ridge surface 252 and the front groove surface 254, that is, the smoothness of the operation of the electric brake device 34 decreases. Since the present electric brake device 34 is designed such that the above-described reverse efficiency is relatively high, a decrease in smoothness becomes particularly a problem. Even when the standby control is performed, as can be understood from the second of FIG. 7, the output cylinder 154 does not move backward with respect to the input shaft 148 until the rear ridge surface 256 and the rear groove surface 258 come into contact with each other, and the grease 250 unevenly distributed between the rear ridge surface 256 and the rear groove surface 258 sufficiently turns around between the front ridge surface 252 and the front groove surface 254.

In view of the above, in the present electric brake device 34, the control of moving the output cylinder 154 backward to a backward movement position where the clearance CL is equal to or more than the backlash amount BL at a suitable timing or at a suitable frequency, that is, the backward movement control, is executed. Specifically, when the braking force request has cancelled or when there is no braking force request, the input shaft 148, that is, the electric motor 144, is operated to reversely rotate such that the output cylinder 154 is moved backward by a second setting distance $\Delta X_2$ ($\geq$BL) from the braking force disappearance position $X_0$. The third of FIG. 7 illustrates a state where the output cylinder 154 is located at the backward movement position. In this state, the rear ridge surface 256 and the rear groove surface 258 come into contact with each other, and the grease 250, which is unevenly distributed between the rear ridge surface 256 and the rear groove surface 258, sufficiently turns around the gap between the front ridge surface 252 and the front groove surface 254. As such a backward movement control is executed, the smoothness of operation of the electric brake device 34 is guaranteed.

Incidentally, in the backward movement control, when the output cylinder 154 moves backward beyond the standby position in order to move the output cylinder 154 backward to the backward movement position, the above-described responsiveness is predetermined to decrease. Thus, in the backward movement control, the output cylinder 154 is returned to the standby position after the output cylinder 154 is moved backward to the backward movement position.

In the above description, for easy understanding, the standby control and the backward movement control are described to be executed based on the position of the output cylinder 154. However, the rotational position θ of the electric motor 144 is controlled in the actual control of the actuator 110. That is, instead of the braking force disappearance position $X_0$, the first setting distance $\Delta X_i$, and the second setting distance $\Delta X_2$, a braking force disappearance rotational position $\theta_0$, a first set rotational amount $\Delta\theta_1$, and a second set rotational amount $\Delta\theta_2$ that are the rotational position and the rotational amounts of the electric motor 144 equivalent to the braking force disappearance position and the first and second setting distances are adopted, and the rotational position θ of the electric motor 144 is controlled based on the braking force disappearance rotational position and the first and second rotational amounts. In the description of a control flow to be performed below, the control of the electric brake device 34 is described using the braking force disappearance rotational position $\theta_0$, the first set rotational amount $\Delta\theta_1$, and the second set rotational amount $\Delta\theta_2$.

[H] Condition, Timing, Frequency, and the Like of Execution of Backward Movement Control In the present electric brake device 34, that is, the present brake system, in short, when there is no request with respect to the electric brake device 34, the standby control and the backward movement control are selectively executed, and two modes of a first mode and a second mode are set regarding the execution of the backward movement control. The first mode is simply a mode in which the backward movement control is executed as needed, in other words, a mode in which the frequency of execution of the backward movement control is suppressed to be low, and the second mode is a mode in which the backward movement control is executed as many as possible, in other words, a mode in which the frequency of execution of the backward movement control is relatively high. According to the first mode, it is possible to reduce occurrence of a situation where the above-described decrease in responsiveness is predicted. On the other hand, according to the second mode, the above-described smoothness of operation of the electric brake device 34 can be more sufficiently guaranteed. Whether the backward movement control is executed in either the first mode or the second mode can be randomly selected by the driver by operating an operation switch.

In the first mode, the standby control and the backward movement control are selectively executed by using the disappearance of the braking force request for the electric brake device 34 as a trigger. Specifically, in principle, an event that the number of times n (hereinafter simply also referred to as a "braking counting number n") at which the electric brake device 34 has generated a braking force after the standby control is executed and the backward movement control is executed at the latest exceeds a set number of times, that is, a set counting number $n_0$ is set as a pre-set precondition, and the execution of the backward movement control is started in a case where the pre-set precondition is satisfied. Generally, the backward movement control is executed in a case where the pre-set precondition is satisfied based on the pre-set precondition set based on an activating state of the electric brake device 34. In detail, the backward movement control may be executed when an activating state predicted that the smoothness of operation is impaired to a set level is brought about.

In the first mode, the execution of either the standby control or the backward movement control is started when the braking force request has cancelled. On the other hand, in the second mode, although the event that there is no braking force request is used as a pre-set precondition the backward movement control is executed as long as a set allowable condition is satisfied. In detail, as long as the vehicle is in a situation in which the possibility of a brake operation by the driver is low (hereinafter simply also referred to as "in a low brake operation possibility situation"), even when the output cylinder 154 is located at the standby position by the standby control, the execution of the backward movement control is allowed in a case where the backward movement control is not yet executed after the braking force request is cancelled. Specifically, when the system determines to be in a situation there is no risk of colliding against a preceding vehicle, an obstacle, or the like based on a peripheral situation monitored by the peripheral monitoring system provided in the vehicle described earlier, the execution of the backward movement control is allowed. Even in a case where the traveling speed v of the vehicle is equal to or less than a set speed v0 that is set to be relatively low, and an accelerator operation is not performed, the execution of the backward movement control is allowed. Generally, whether the vehicle is determined to be in the brake operation possibility situation at least based on one of a traveling state of the vehicle and the operating state of the vehicle, and the execution of the backward movement control is allowed based on the determination.

Moreover, in the second mode, in the brake system, on the condition that the sum of a braking force to be generated by the hydraulic brake device 32 and braking forces to be generated by the two electric brake devices 34, that is, the sum of braking force required to these brake devices (corresponding to the above-described deficient braking force $F_{IS}$) is decreasing and the sum is equal to or lower than a set level ($F_{IS-TH}$), a braking force required to one of the electric brake devices 34 is set to zero by subtracting an electric braking force reduction amount $\Delta_{FEM}$ therefrom, and the reduction amount is added to the braking force required to the hydraulic brake device 32. As a result, the braking force request for one electric brake device 34 is cancelled, and the opportunity of execution of the backward movement control in the one electric brake device 34 increases. That is, the frequency of execution of the backward movement control in the one electric brake device 34 increases. To briefly describe whether a braking force request for any of the two electric brake devices 34 is reduced, in the present second mode, a braking force request for an electric brake device 34 with a longer elapsed time after the backward movement control is executed is reduced. Incidentally, the above condition is a condition set from a viewpoint of not having a bad influence even when the responsiveness of one electric brake device 34 decreases due to the execution of the backward movement control.

In the present brake system, a condition for prohibiting the backward movement control irrespective of whether the vehicle is in the first mode or the second mode is set, and the backward movement control is prohibited in a case where the prohibited condition is satisfied. Specifically, in a case where the backward movement control is executed in the separate electric brake device 34 that is the other brake device provided in the brake system, the backward movement control of the electric brake device 34 is prohibited in order to avoid that both of the two electric brake devices 34 simultaneously execute the backward movement control. Each electric brake device 34 has a function of transmitting a signal indicating that the backward movement control is performed in itself, that is, a signal showing the execution of the backward movement control. The execution of the backward movement control in another electric brake device 34 is prohibited based on the signal.

In a case where the backward movement control is determined to be performed in one of the two electric brake devices 34 based on the signal that a responsiveness improvement control that is a control for further improving the responsiveness of the hydraulic brake device 32 that is the separate brake device is executed. As described earlier, in the hydraulic brake device 32, in principle, the pumps 60 of the actuator unit 44 are operated when there is a braking force request. However, when the backward movement control is executed in one of the electric brake devices 34, the pumps 60 are driven (hereinafter simply also referred to as a "preceding pump operation") even when there is no braking force request for the hydraulic brake device 32. That is, the timing of start of operation of the pump device 73 is advanced. As a result, the above-described time lag is shortened, the delay of generation of the braking force by the hydraulic brake device 32 is improved, and a decrease in the responsiveness of the entire brake system is prevented.

In the responsiveness improvement control, the braking force generated by the hydraulic brake device 32 generates is raised as long as one braking force request lasts. Specifically, a hydraulic braking force correction gain $G_{HY}$ that is a gain for correcting the braking force request for the hydraulic brake device 32, that is, the target hydraulic braking force $F_{HY}*$ described earlier is increased, and the pressure of the hydraulic fluid to be supplied to each wheel brake 46 by the controlled hydraulic pressure supply device 74 is made high. Incidentally the hydraulic braking force correction gain $G_{HY}$ is a coefficient that corrects the target hydraulic braking force $F_{HY}*$ by multiplying the target hydraulic braking force $F_{HY}*$, is set to 1 in a case where the backward movement control is not executed in any electric brake device 34, and is set to a value larger than 1 in a case where the backward movement control is executed in one of the electric brake devices 34. Accordingly, the followability of a braking force actually generated with respect to any fluctuation of the braking force request for the hydraulic brake device 32 is improved, and a decrease in the responsiveness of the entire brake system is prevented.

Figure 8:
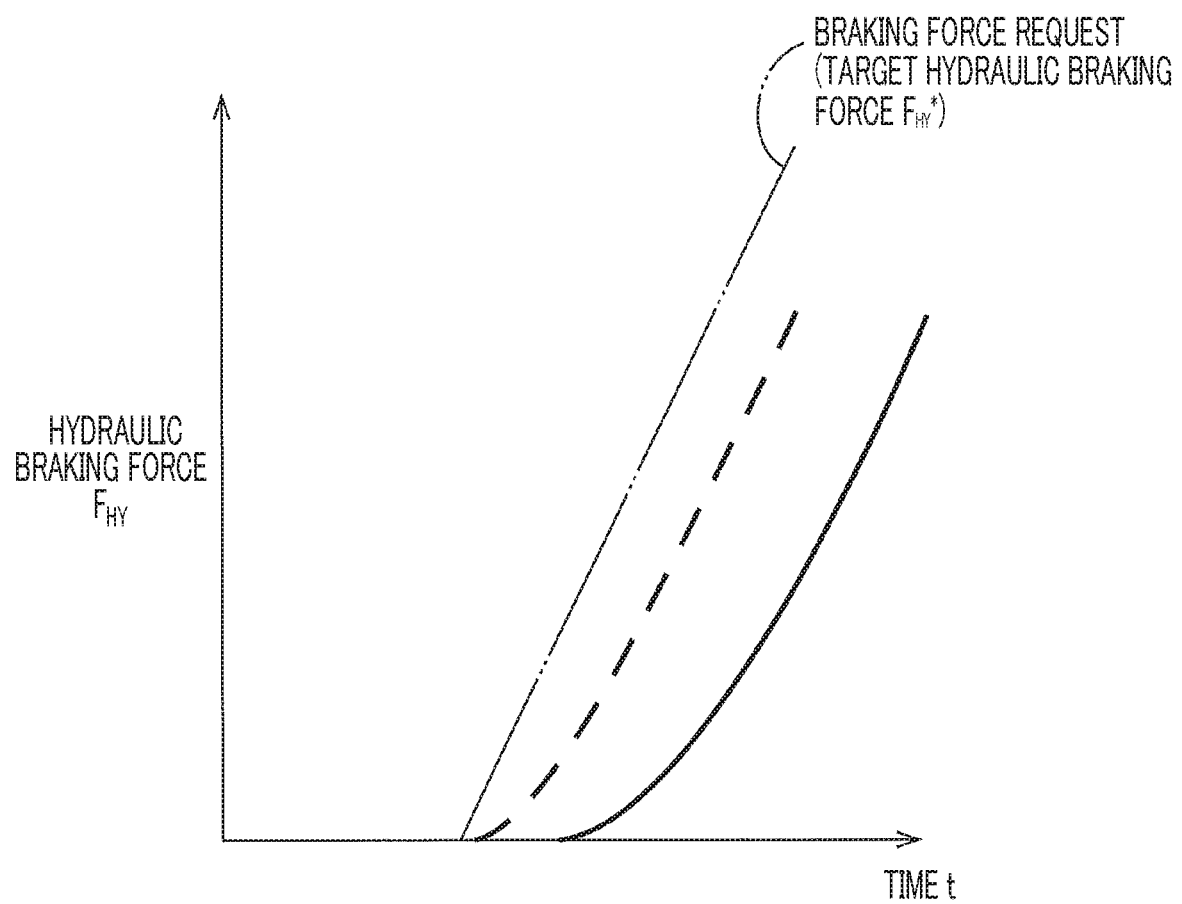
FIG. 8 is a graph illustrating characteristics of a braking force of the hydraulic brake device illustrated in FIG. 1 and changes in the characteristics.

The characteristics of the hydraulic braking force $F_{HY}$ actually generated with respect to the braking force request by the responsiveness improvement control are changed as illustrated in the graph of FIG. 8. A two-dot chain line in the graph represents the braking force request, that is, the target hydraulic braking force $F_{HY}*$, and a solid line represents the characteristics of the hydraulic braking force $F_{HY}$ generated in a case where the responsiveness improvement control is not executed. In contrast, in a case where the responsiveness improvement control is executed, the hydraulic braking force $F_{HY}$ shows the characteristics as indicated by a dashed line. From this graph, it can be seen that, due to the execution of the responsiveness improvement control, the timing of rising of the hydraulic braking force $F_{HY}$ is advanced, and the increasing gradient of the hydraulic braking force $F_{HY}$ after the rising also becomes large. As the responsiveness improvement control, solely one of advancing the timing of start of the operation of the pump device 73 and raising the braking force generated by the hydraulic brake device 32 may be performed.

[I] Control Flow of Brake System

Figure 9:
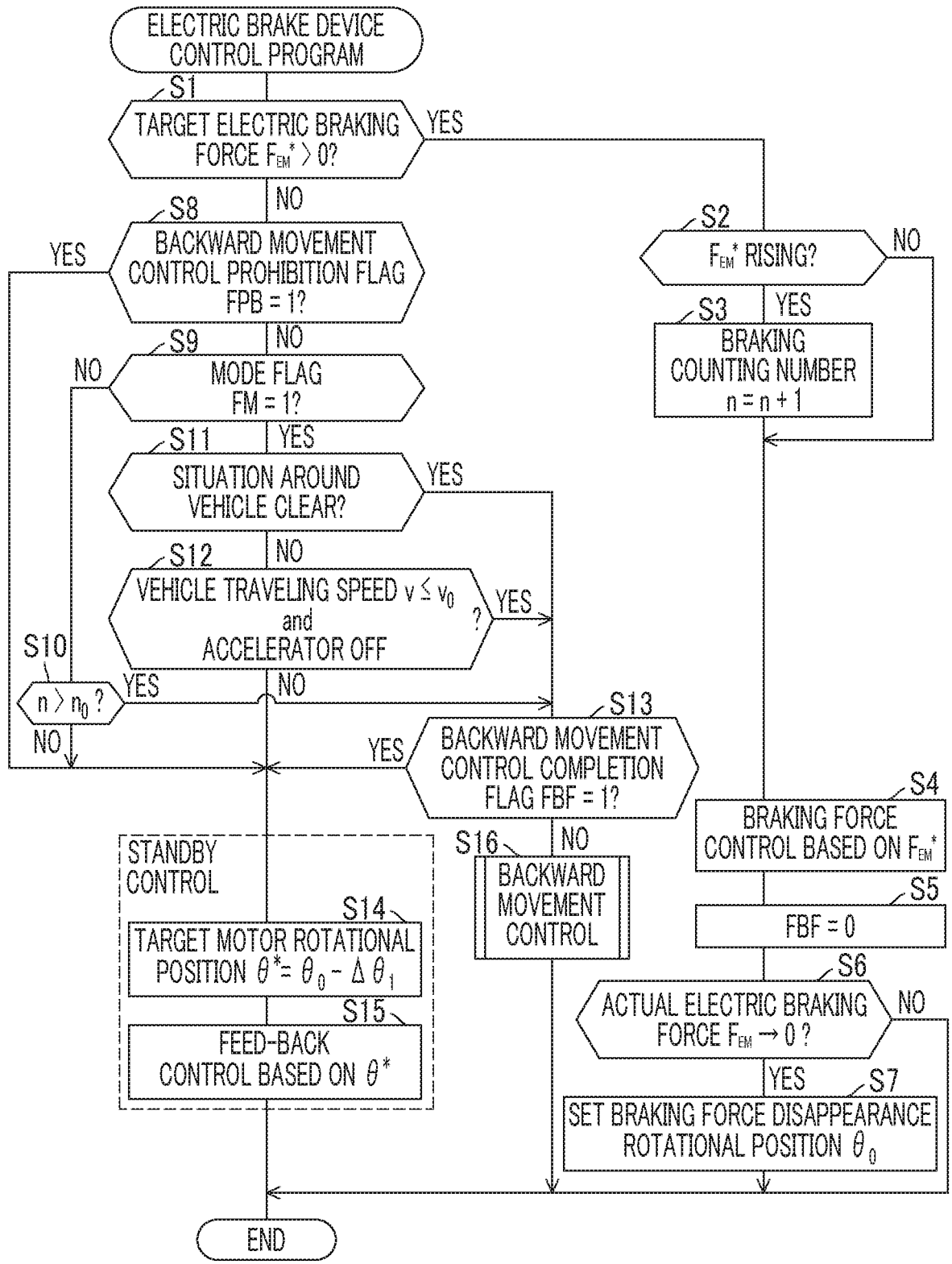
FIG. 9 is a flowchart illustrating an electric brake device control program to be executed in an electronic control unit for an electric brake device that is a controller of the electric brake device.
Figure 10:
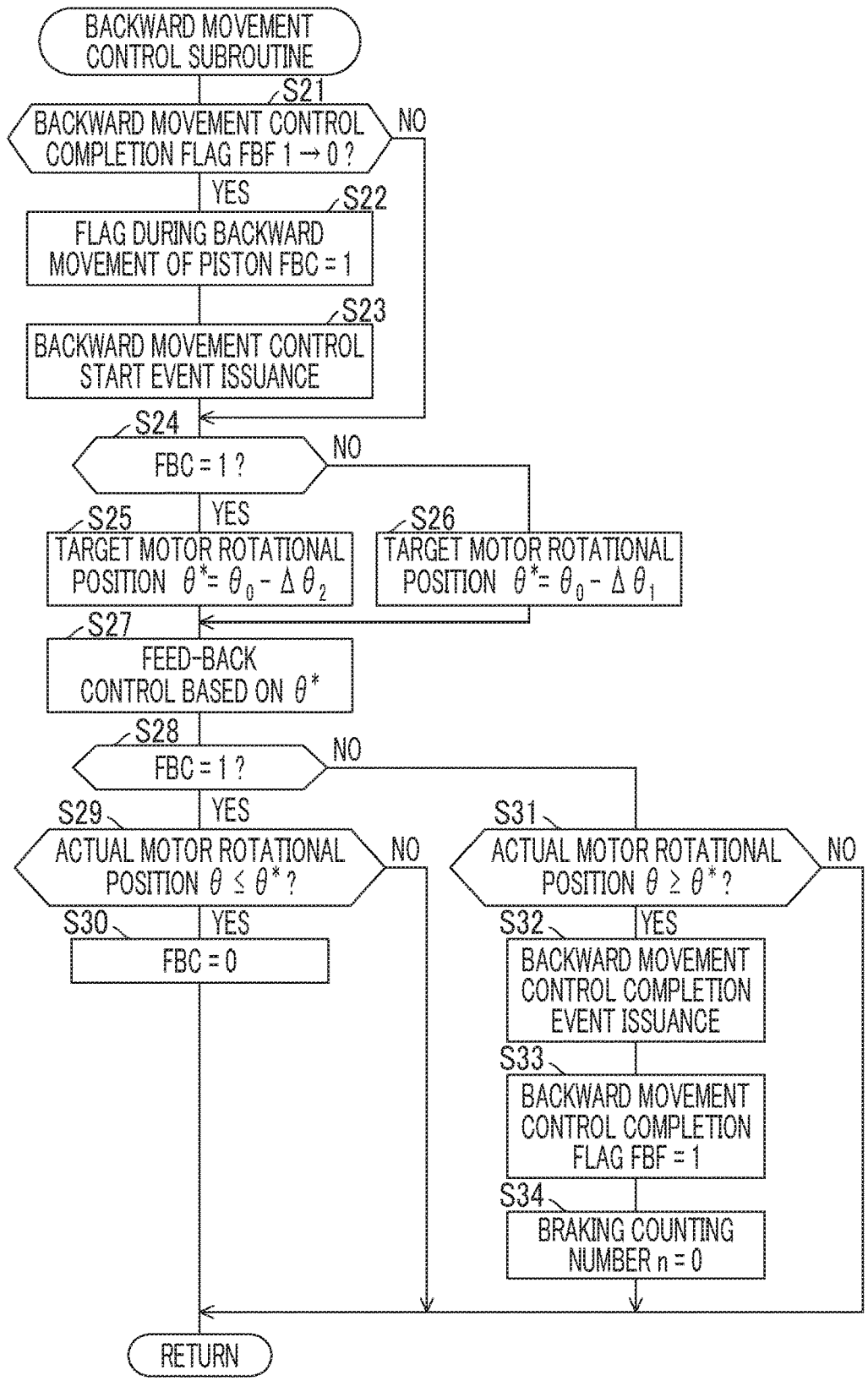
FIG. 10 is a flowchart illustrating a backward movement control subroutine that constitutes the electric brake device control program.
Figure 11:
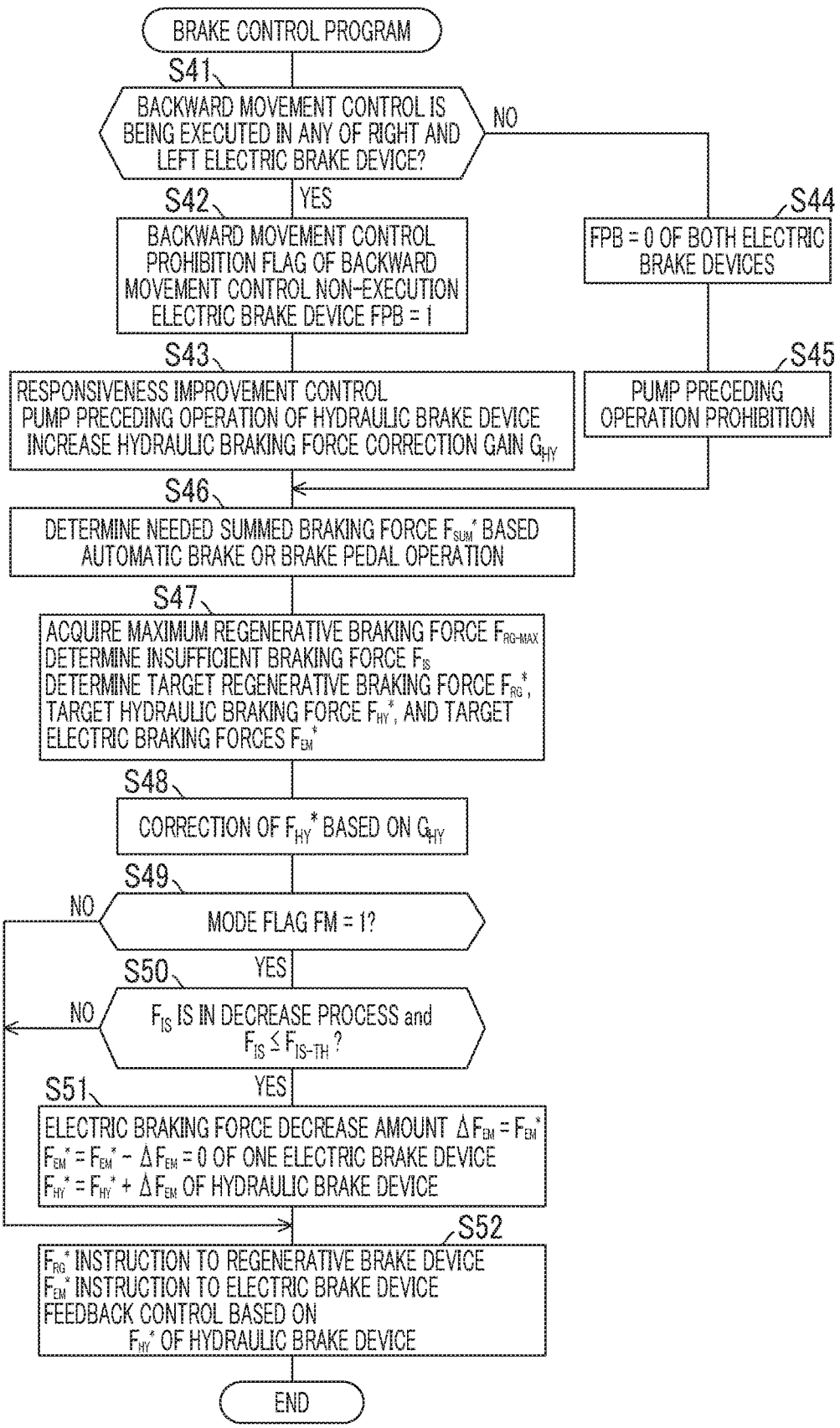
FIG. 11 is a flowchart of a brake control program to be executed in the electronic control unit for a hydraulic brake device that functions as an integrated controller in the brake system.

The control of each electric brake device 34 including the standby control and thee backward movement control is performed as the EM-ECU 232 that is a controller of each electric brake device 34 repeatedly executes an electric brake device control program (including a backward movement control subroutine illustrated in a flowchart of FIG. 10) illustrated in a flowchart of FIG. 9 in a short time pitch (several msec to several tens msec), and the comprehensive control of the brake system, such as the determination of the braking force request for each brake device, and the control of the hydraulic brake device 32 is performed as the HY-ECU 230 repeatedly executes a brake control program illustrated in a flowchart of FIG. 11 in a short time pitch (several msec to several tens msec). Hereinafter, processing of the controls according to these programs will be sequentially described along the flowcharts.

i) Control Processing of Electric Brake Device

To describe the control processing of the electric brake device 34, first, whether or not there is any braking force request for itself is determined in Step 1 (hereinafter simply also referred to as "S1", the same applies to other steps). Specifically, whether or not the target electric braking force $F_{EM}*$ that is the braking force request is larger than 0 is determined.

In a case where there is a braking force request, in S2, whether or not the braking force request is rising, that is, whether or not the target electric braking force $F_{EM}*$ exceeds 0 in the current execution of the program is determined. In a case where the braking force request is rising, in S3, the above-described braking counting number n is counted up. In S4, as described above, feedback control of the electric braking force $F_{EM}$ based on the target electric braking force $F_{EM}*$ is executed. Specifically, the supply electric current I to the electric motor 144 is controlled based on the axial force $W_S$ detected by the axial force sensor 190 such that the electric braking force $F_{EM}$ becomes the target electric braking force $F_{EM}*$.

Next, a backward movement control completion flag FBF is reset in S5. The backward movement control completion flag FBF is a flag showing whether or not the execution of backward movement control is already completed after the braking force request is cancelled, and is a flag of which a flag value is set to "1" in a case where the execution of backward movement control is completed and the flag value is set to "0" in a case where the execution of backward movement control is not completed. In S6, whether or not an actually generated electric braking force $F_{EM}$ reaches "0" in the execution of the program is determined. In a case where the actually generated electric braking force $F_{EM}$ reaches "0" this time, in S7, the position of the output cylinder 154 is regarded to be located at the braking force disappearance position $X_0$, and the rotational position θ of the electric motor 144 is set to the braking force disappearance rotational position $θ_0$.

In a case where a determination is made that there is no braking force request in S1, in S8, the value of a backward movement control prohibition flag FPB is determined. The backward movement control prohibition flag FPB is a flag for prohibiting the backward movement control from being simultaneously executed in the two electric brake devices 34. As will be described below, in the HY-ECU 230, the flag value is set to "1" when the backward movement control is executed in another electric brake device 34 and is set to "0" when the backward movement control is not executed.

In a case where the backward movement control is determined not to be prohibited in the electric brake device 34 by the value of the backward movement control prohibition flag FPB, in S9, whether the execution mode of the backward movement control is determined to be the above-described first mode or the above-described second mode based on a mode flag FM. The mode flag FM is a flag of which the flag value is set to "0" in a case where the first mode is selected and of which the flag value is set to "1" in a case where the second mode is selected. In a case where the first mode is selected, in S10, whether or not the braking counting number n exceeds the set counting number $n_0$ is determined. In the case of $n \leq n_0$, the standby control in S14 and the subsequent step is executed, and in the case of $n > n_0$, in S13, whether or not the backward movement control is already completed after the braking force request has cancelled is determined based on the value of the backward movement control completion flag FBF. In a case where the backward movement control is already completed and the standby control after S14 and the subsequent steps is not yet completed, the backward movement control of S16 is executed.

In a case where the second mode is determined to be selected in S9, in S11, whether or not a peripheral situation is clear, that is whether or not an obstacle, a preceding vehicle, or the like that may have a possibility of colliding against the vehicle, is present based on the determination of the peripheral monitoring system as the allowable condition of the backward movement control. In S12, whether or not the traveling speed v of the vehicle is equal to or less than set speed v0, and the accelerator operation is performed is determined as another allowable condition of the backward movement control. In a case where neither of the two allowable conditions of S11 and S12 is satisfied, the standby control in S14 and the subsequent step is executed. In a case where neither of the two allowable conditions is satisfied, in S13, whether or not the backward movement control is already completed after the braking force request has cancelled is determined based on the value of the backward movement control completion flag FBF. The standby control in S14 and the subsequent step is executed in a case where the backward movement control is already completed, and the backward movement control in S16 is executed in a case where the backward movement control is not yet completed. In a case where the backward movement control is determined to be prohibited in S8, the standby control in S14 and the subsequent step is executed.

In the standby control, first, in S14, a target motor rotational position $\theta^*$ is determined by subtracting the first set rotational amount $\Delta\theta_1$ from the braking force disappearance rotational position $\theta_0$. Then, in S15, a feedback control in which an actual motor rotational position $\theta$ becomes the determined target motor rotational position $\theta^*$ is made. That is, the supply electric current I to the electric motor 144 according to the feedback control is determined, and the supply electric current I is supplied to the electric motor 144. In the standby control, in a case where the backward movement to the standby position of the output cylinder 154 is allowed and the output cylinder 154 is already located at the standby position, the position is maintained.

The backward movement control of S16 is executed by executing the backward movement control subroutine illustrated in a flowchart of FIG. 10. In the processing according to this subroutine, first, in S21, whether or not the backward movement control is started is determined in the execution of this program based on the above-described backward movement control completion flag FBF. Specifically, whether or not the execution of the current backward movement control subroutine is a first execution in a state where the flag value of the backward movement control completion flag FBF is "0" is determined.

In a case where the backward movement control is determined to have been started in S21, in S22, the flag value of a flag FBC during the backward movement of the piston is set to "1". The flag FBC during the backward movement of the piston is a flag of which the flag value is set to "1" in a case where the piston 142, that is, the output cylinder 154, is in the midst of moving backward up to the above-described backward movement position and the flag value is set to "0" in a case where the piston 142 is not in the midst of moving backward. In S23, the fact that that backward movement control has been started in the electric brake device 34, that is, in itself is issued to the HY-ECU 230. On the other hand, in a case where the piston 142 is determined to already have moved backward in S21, S22 and S23 are skipped.

In the subsequent S24, whether or not the piston 142 is moving backward is determined based on the flag value of the flag FBC during the backward movement of the piston. In a case where the output cylinder 154 is in the midst of moving backward, in S25, the target motor rotational position $\theta^*$ is determined by subtracting the second set rotational amount $\Delta\theta_2$ from the braking force disappearance rotational position $\theta_0$. That is, the target motor rotational position $\theta^*$ for moving the output cylinder 154 backward to the above-described backward movement position is determined. On the other hand, in a case where the piston 142 is not moving backward, that is, after the output cylinder 154 has reached the backward movement position, in S26, the target motor rotational position $\theta^*$ is determined by subtracting the first set rotational amount $\Delta\theta_1$ from the acquired braking force disappearance rotational position $\theta_0$. That is, after the piston is moved backward, the target motor rotational position $\theta^*$ for returning the output cylinder 154 to move the output cylinder 154 forward up to the standby position is determined. Then, in S27, a feedback control in which the actual motor rotational position $\theta$ becomes the determined target motor rotational position $\theta^*$ based on the target motor rotational position $\theta^*$ determined by S25 or S26.

In a case where the piston 142 is determined to be moving backward in S28, whether or not the actual motor rotational position $\theta$ reaches the target motor rotational position $\theta^*$ by the feedback control, that is, the output cylinder 154 has moved backward up to the backward movement position is determined in S29. In a case where the actual motor rotational position $\theta$ reaches the target motor rotational position $\theta^*$, in S30, the flag value of the flag FBC during the backward movement of the piston is reset to "0".

On the other hand, in the determination of S28, in a case where the piston 142 is determined not to be moving backward, in S31, whether or not the actual motor rotational position $\theta$ has reached the target motor rotational position $\theta^*$ by the feedback control, that is, whether or not the output cylinder 154 has moved forward up to the standby position is determined. In a case where the actual motor rotational position $\theta$ has reached the target motor rotational position $\theta^*$, the event that the backward movement control is completed is issued to the HY-ECU 230 in S32, the backward movement control completion flag FBF is set to "1" in S33, and the braking counting number n is reset in S34.

ii) Comprehensive Control Processing of Brake System

To describe the comprehensive control processing of the brake system, first, in S41, whether or not the backward movement control is executed in one of the two electric brake devices 34 is determined based on issuance of the start and the end of execution of the backward movement control from each electric brake device 34.

In one electric brake device 34, in a case where the backward movement control is executed, in S42, the flag value of the backward movement control prohibition flag FPB of the other electric brake device 34 is set to "1", and the backward movement control in the electric brake device 34 is prohibited. Then, in S43, the pumps 60 of the hydraulic brake device 32 are precedingly operated, and the hydraulic braking force correction gain $G_{HY}$ is increased as described earlier. That is, the above-described responsiveness improvement control is executed on the hydraulic brake device 32 by the processing of S43. Although omitted in the flowchart, the hydraulic braking force correction gain $G_{HY}$ is returned to a normal value, that is, "1", when one braking force request has been cancelled.

In S41, in a case where the backward movement control is determined not to be executed even in any electric brake device 34, the flag values of the backward movement control prohibition flags FPB of both of the electric brake devices 34 are set to "0" in S44, and the preceding operation of the pumps 60 of the hydraulic brake device 32 is prohibited in S45.

In the subsequent S46, as described regarding the basic braking force control, the needed summed braked force $F_{SUM}*$ is determined based on the presence or absence of the braking force request by the automatic braking from the AO-ECU 233 or the presence or absence of the braking force request by the driver's operation of the brake pedal 40. Incidentally, in a case where there is no braking force request, the needed summed braked force $F_{SUM}*$ is determined as "0". In the next S47, as in the above-described description, the maximum regenerative braking force $F_{RG-MAX}$ is acquired, the deficient braking force $F_{IS}$ is determined, the target regenerative braking force $F_{RG}*$, the target hydraulic braking force $F_{HY}*$, and the target electric braking forces $F_{EM}*$ that are the braking force requests for the respective brake devices are determined. Then, in S48, the target hydraulic braking force $F_{HY}*$ is corrected based on the hydraulic braking force correction gain $G_{HY}$. In a case where the responsiveness improvement control is not performed, the target hydraulic braking force $F_{HY}*$ is maintained at the value determined in S47.

Then, in S49, in a case where whether or not the mode of execution of the backward movement control is the first mode or the second mode is determined, and in a case where the mode of execution is the second mode, in S50, whether or not the condition that the deficient braking force $F_{IS}$ that the sum of the target hydraulic braking force $F_{HY}*$ and the target electric braking forces $F_{EM}*$ for both the rear wheels 10R is in a decrease process and the deficient braking force $F_{IS}$ is equal to or less than the set level $F_{IS\text{-}TH}$ is satisfied is determined. In a case where the condition is satisfied, in S51, the target electric braking force $F_{EM}*$ for one electric brake device 34 is reduced by the electric braking force reduction amount $\theta F_{EM}$ and is set to "0", and the target hydraulic braking force $F_{HY}*$ is increased by the electric braking force reduction amount delta $F_{EM}$.

After the determination, correction, and increase/decrease as described above are performed, in S52, the signal regarding the target regenerative braking force $F_{RG}*$ is sent to the HB-ECU 29 that is the controller of the regenerative brake device 30, the signals regarding each target electric braking force $F_{EM}*$ is transmitted to the EM-ECU 232 that is the controller of each electric brake device 34, and the feedback control of the hydraulic braking force $F_{HY}$ based on target hydraulic braking force $F_{HY}*$ for the hydraulic brake device 32 is executed. Incidentally, when the target hydraulic braking force $F_{HY}*$ exceeds 0 without executing the responsiveness improvement control, the pumps 60 of the hydraulic brake device 32 are driven by the processing of S52.

What is claimed is:

1. An electric brake device configured to be mounted on a vehicle, the electric brake device comprising:
   a rotating body configured to rotate together with a wheel;
   a friction member configured to generate a braking force due to friction with the rotating body by being pressed against the rotating body;
   an electric motor configured to serve as a drive source;
   a piston;
   an operation conversion mechanism configured to convert a rotation of the electric motor into a forward and backward movement of the piston;
   an actuator configured to press the friction member against the rotating body by forward movement of the piston; and
   a controller configured to control the actuator by controlling the rotation of the electric motor, wherein:
   the operation conversion mechanism is configured to include
   a rotating member that has one of a male screw and a female screw threadedly engaged with each other in a state where a lubricant is interposed, and the rotating member being rotatable by the rotation of the electric motor, and
   a linear motion member that has the other of the male screw and the female screw and is adapted to be movable forward and backward to move the piston forward and backward; and
   the controller is configured to selectively execute, when there is no braking force request for the electric brake device, a standby control of causing the linear motion member to stand by at a standby position where a clearance between the friction member and the rotating body is not larger than a backlash between the male screw and the female screw, and a backward movement control of moving the linear motion member backward to a backward movement position where the clearance is equal to or more than the backlash,
   wherein the controller is configured to allow execution of the backward movement control in a low brake operation possibility situation where a monitoring system, mounted on the vehicle, determines that the possibility of a brake operation by a driver is low, and
   wherein the controller is configured to, in a case where the vehicle is equipped with the monitoring system that monitors a situation around the vehicle, allow execution of the backward movement control based on an instruction relying on a determination that the vehicle is in the low brake operation possibility situation, the instruction being received from the monitoring system.

2. The electric brake device according to claim 1, wherein the controller is configured to start execution of the standby control when the braking force request for the electric brake device has been cancelled when a pre-set precondition is not satisfied, and to start execution of the backward movement control when the braking force request has been cancelled when the pre-set precondition is satisfied.

3. The electric brake device according to claim 2, wherein the pre-set precondition is set based on an activating state of the electric brake device.

4. The electric brake device according to claim 3, wherein:
   the activating state of the electric brake device is indexed depending on a number of times the electric brake device has generated the braking force after the backward movement control is executed ; and
   the controller is configured to use an event, wherein the number of times has exceeded a pre-set number, as the pre-set precondition and to start the execution of the backward movement control when the pre-set precondition is satisfied.

5. The electric brake device according to claim 1, wherein the low brake operation possibility situation is determined based on at least one of an operating state of the vehicle and a traveling state of the vehicle.

6. The electric brake device according to claim 5, wherein:
   the traveling state of the vehicle is indexed depending on a presence or absence of an accelerator operation of the vehicle;
   the operating state of the vehicle is indexed depending on a traveling speed of the vehicle; and
   the controller is configured to allow execution of the backward movement control when the traveling speed of the vehicle is equal to or less than a set speed and the accelerator operation is not performed.

7. The electric brake device according to claim 1, wherein the backward movement control includes a control for moving the linear motion member forward up to the standby position after the linear motion member is moved backward up to the backward movement position.

8. The electric brake device according to claim 1, wherein the controller is configured to transmit a signal instructing execution of the backward movement control.

9. A vehicular brake system comprising:
the electric brake device according to claim 1; and
a separate brake device provided at a wheel separate from the wheel provided with the electric brake device.

10. The brake system according to claim 9, wherein the separate brake device is a hydraulic brake device configured to include:
a wheel brake that generates a braking force by pressing another friction member against another rotating body that rotates together with the wheel separate from the wheel provided with the electric brake device, based on a pressure of a hydraulic fluid to be supplied to the separate brake device,
a high pressure source device configured to supply a high-pressure hydraulic fluid to the wheel brake when the high pressure source device is operated, and
a pressure adjusting device configured to adjust the pressure of the hydraulic fluid to be supplied from the high pressure source device to the wheel brake in accordance with a braking force request for the separate brake device.

11. The brake system according to claim 10, wherein the brake system is configured to execute a responsiveness improvement control for improving responsiveness of the separate brake device in response to the braking force request for the separate brake device when the backward movement control is executed in the electric brake device.

12. The brake system according to claim 11, wherein the responsiveness improvement control is a control for performing at least one of advancing a timing of starting an operation of the high pressure source device and raising the pressure of the hydraulic fluid adjusted by the pressure adjusting device.

13. The brake system according to claim 12, wherein:
the controller is configured to transmit a signal instructing execution of the backward movement control, and
the responsiveness improvement control is configured to be executed based on the signal.

14. The brake system according to claim 9, wherein the brake system is configured to execute a responsiveness improvement control for improving responsiveness of the separate brake device in response to a braking force request for the separate brake device when the backward movement control is executed in the electric brake device.

15. The brake system according to claim 14, wherein
the separate brake device is a hydraulic brake device configured to include:
a wheel brake that generates a braking force by pressing another friction member against another rotating body that rotates together with the wheel separate from the wheel provided with the electric brake device, based on a pressure of a hydraulic fluid to be supplied to the separate brake device,
a high pressure source device configured to supply a high-pressure hydraulic fluid to the wheel brake when the high pressure source device is operated, and
a pressure adjusting device configured to adjust the pressure of the hydraulic fluid to be supplied from the high pressure source device to the wheel brake in accordance with the braking force request for the separate brake device, and
the responsiveness improvement control is a control for performing at least one of advancing a timing of starting operation of the high pressure source device and raising the pressure of the hydraulic fluid adjusted by the pressure adjusting device.

16. The brake system according to claim 15, wherein:
the controller is configured to transmit a signal instructing execution of the backward movement control, and
the responsiveness improvement control is configured to be executed based on the signal.

17. The brake system according to claim 9, wherein when a sum of the braking force generated by the electric brake device and the braking force generated by the separate brake device decreases to be equal to or less than a set level, the brake system is configured to cancel a braking force request for the electric brake device and to increase the braking force generated by the separate brake device by an amount of the braking force to be generated by the electric brake device.

18. The brake system according to claim 9, wherein:
the separate brake device includes another controller configured to execute backward movement control; and
the vehicle brake system is configured to, when one of the electric brake device and the separate brake device executes the backward movement control, prohibit the other of the electric brake device and the separate brake device from executing the backward movement control.

* * * * *